United States Statutory Invention Registration [19]

[11] Reg. Number: H691

Kitaguchi et al. [43] Published: Oct. 3, 1989

[54] HEAT DEVELOPABLE PHOTOGRAPHIC ELEMENT

[75] Inventors: Hiroshi Kitaguchi; Masatoshi Kato, both of Kanagawa, Japan

[73] Assignee: Fuji Photo Film Co., Ltd., Japan

[21] Appl. No.: 153,535

[22] Filed: Feb. 1, 1988

Related U.S. Application Data

[63] Continuation of Ser. No. 809,627, Dec. 16, 1985, abandoned.

[30] Foreign Application Priority Data

Dec. 20, 1984 [JP] Japan ..... 59-268926

[51] Int. Cl.[4] ..... G03C 5/54; G03C 1/34

[52] U.S. Cl. ..... 430/203; 430/611; 430/617; 430/619; 430/957; 430/959

[58] Field of Search ..... 430/203, 617, 619, 957, 430/955, 611

[56] References Cited

U.S. PATENT DOCUMENTS

| | | | |
|---|---|---|---|
| 3,761,270 | 9/1973 | de Mauraic et al. | 430/617 |
| 3,839,041 | 10/1974 | Hiller | 430/955 |
| 3,844,788 | 10/1974 | Burness et al. | 430/617 |
| 3,877,940 | 4/1975 | Ericson | 430/617 |
| 4,022,617 | 5/1977 | McGuckin | 430/617 |
| 4,404,390 | 9/1983 | Altland et al. | 430/619 |
| 4,550,071 | 10/1985 | Aono et al. | 430/619 |
| 4,619,883 | 10/1986 | Aono et al. | 430/203 |
| 4,626,499 | 12/1986 | Kato et al. | 430/203 |
| 4,639,408 | 1/1987 | Kitaguchi et al. | 430/203 |
| 4,639,414 | 1/1987 | Sakaguchi et al. | 430/203 |
| 4,678,735 | 7/1987 | Kitaguchi et al. | 430/203 |

*Primary Examiner*—Teddy S. Gron
*Assistant Examiner*—Richard Treanor
*Attorney, Agent, or Firm*—Sughrue, Mion, Zinn, Macpeak and Seas

[57] ABSTRACT

A heat-developable photographic element containing a light-sensitive silver halide and a binder on a support, and in addition, a base precursor and a photographic reagent capable of releasing a compound represented by the general formula (I) by reaction with a base in a light-sensitive layer and/or an image receiving layer.

(I)

wherein Y is an atomic group necessary for forming a 5-, 6- or 9-membered heterocyclic ring.

The photographic material has excellent temperature compensation capability and low fog.

9 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HEAT DEVELOPABLE PHOTOGRAPHIC ELEMENT

This is a continuation of application Ser. No. 809,627, filed Dec. 16, 1985, which is now abandoned.

FIELD OF THE INVENTION

The present invention relates to a heat-developable photographic element, and particularly, to a heat-developable photographic element having stable photographic properties irrespective of changes in developing treatment conditions.

BACKGROUND OF THE INVENTION

A photographic process using silver halide has heretofore been most widely used because it is superior to other photographic processes such as electrophotography and diazo photography in photographic characteristics such as sensitivity and control of gradation. In recent years, a technique for forming images rapidly and in a simplified manner has been developed, in which a light-sensitive material containing silver halide is not wet-developed with a developer, for example, but is dry-developed, for example, by heating.

A heat-developable light-sensitive material is known in the art and is described in, for example, *Shashin Kogaku no Kiso* (*Fundamentals of Photographic Engineering*), pp. 553–555 (Corona Co., Ltd., Tokyo, 1979), *Eizo Joho* (*Image Information*), April 1978, p. 40, *Nebletts Handbook of Photography and Reprography,* pp. 32–33 (7th Ed., Van Nostrand Reinhold Company, 1977), U.S. Pat. Nos. 3,152,904, 3,301,678, 3,392,020, 3,457,075, British Pat. Nos. 1,131,108, 1,167,777, and *Research Disclosure,* June, 1978, pp. 9–15 (RD-17029).

Many methods have been developed to form color images, such as by combining an oxidation product of a developer and a coupler. In connection with this method, U.S. Pat. No. 3,531,286 discloses a combination of a p-phenylenediamine reducing agent and a phenolic or active methylene coupler, U.S. Pat. No. 3,761,270 discloses a p-aminophenol-based reducing agent, Belgian Pat. No. 802,519 and *Research Disclosure,* Sept. 31, 1975, p. 32, disclose a sulfonamidophenol-based reducing agent, and U.S. Pat. No. 4,021,240 discloses a combination of a sulfonamidophenol-based reducing agent and a 4-equivalent coupler.

Another method forms positive color images by the light-sensitive silver/dye bleaching process. In connection with this method, useful dyes and a bleaching method are described in, for example, *Research Disclosure,* April, 1976, pp. 30–32 (RD-14433), ibid., December, 1976, pp. 14–15 (RD-15227), and U.S. Pat. No. 4,235,957.

A further method of forming color images by heat development utilizing a compound having a dye portion and capable of releasing a mobile dye in a positive or negative relation to the reduction reaction of silver halide into silver at a high temperature is disclosed in U.S. Pat. Nos. 4,500,626, 4,503,137 and 4,483,914, Japanese Patent Application (OPI) No. 154445/84 (the term "OPI" as used herein refers to a "published unexamined Japanese patent application").

In many cases, a heat-developable light-sensitive material is developed by heating with a base as a development accelerator. In this development method, however, various problems arise. For example, once a heat-developable light-sensitive material is heated to a high temperature, a long time is required for the temperature to return to an ordinary temperature. As a result, the material is developed excessively and image quality is decreased. Furthermore, even if the same heating pattern is applied for development, slight changes in conditions such as outer temperature, heating temperature, water content of the light-sensitive material, and time produce undesirable variations in development.

Moreover, when a dye formed in or released from the light-sensitive material is transferred to an image receiving element by heating, the problem arises that excessive development is caused by heating to accomplish the transfer of images and then the transferred image is fogged.

In order to overcome the above problems, a diffusion transfer method has been developed. In connection with this technique, a method using acid polymers for neutralization as described in *Research Disclosure,* Vol. 123, p. 22 and ibid., Vol. 180, p. 18030, British Patent 208272A has been proposed. When this method is applied to a heat-developable light-sensitive material, however, the base is too rapidly neutralized, leading to a reduction in image density. Compounds releasing an acid on heating include an acid component capable of being dissolved at temperatures more than 60° C. or releasing a volatile acid described in Japanese Patent Application (OPI) Nos. 58642/74 and 57452/75. However, when such components are applied to a heat-developable light-sensitive material, they neutralize the base before the start of development by heating, thereby preventing development, leading to a reduction in image density.

SUMMARY OF THE INVENTION

An object of the present invention is to provide a novel heat-developable light-sensitive material in which development can be stopped at a suitable time (i.e., a development time having no excessive development and fogged image) without reducing maximum image density, that is, a heat-developable light-sensitive material in which a base resulting from decomposition of a base precursor releases a development inhibitor at a suitable time after the start of development to stop development.

Another object of the present invention is to provide a heat-developable light-sensitive material which is free from unevenness in image density resulting from variations in heating temperature, i.e., materials having a temperature compensation capability.

It has been found that the above objects can be attained by a heat-developable photographic element comprising a support having thereon a light-sensitive silver halide, a binder, a base precursor and a photographic reagent capable of releasing a compound represented by the general formula (I) by reaction with a base.

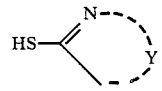

(I)

wherein Y is an atomic group necessary for forming a 5-, 6- or 9-membered heterocyclic ring.

More specifically, the present invention relates to a heat-developable photographic element containing at least a base precursor and a compound capable of releasing a compound represented by the general formula (I) by reaction with a base in a light-sensitive layer and/or an image receiving layer.

DETAILED DESCRIPTION OF THE INVENTION

It is known that in conventional photographic light-sensitive materials, the photographically useful group of a compound represented by the general formula (I) can be blocked and at the time of development, the compound is released.

For example, techniques utilizing a blocking group (e.g., an acyl group and a sulfonyl group) as described in U.S. Pat. No. 3,615,617, a blocking group releasing a photographic reagent through the reverse Michael reaction as described in Japanese Patent Publication No. 17369/79 and U.S. Pat. Nos. 3,791,830 and 4,009,029, a blocking group releasing a photographic reagent with formation of quinone methide or quinone methide-like compounds through intramolecular electron transfer as described in U.S. Pat. Nos. 3,685,991, 3,674,478, 3,993,661, 3,932,480, 4,416,977, and 4,420,554, an intermolecular ring closing reaction as described in U.S. Pat. Nos. 4,358,525, 4,310,612, and a cleavage of 5- or 6-membered rings as described in Japanese Patent Application (OPI) No. 76542/82, and U.S. Pat. Nos. 4,335,200 and 4,350,752 are known. However, these known techniques merely disclose about wet processing utilizing hydrolysis or deprotonation due to the action of $OH^-$ at the time of wet development to obtain a photographic reagent capable of utilizing, there is no disclosure about dry processing utilizing an organic base in these techniques.

It is also known that nitrogen-containing heterocyclic compounds having a mercapto group as represented by the general formula (I) have a development inhibiting effect in a silver halide light-sensitive material. It is disclosed in Japanese Patent Application No. 176351/84 (filed on Aug. 24, 1984 by Fuji Photo Film Co., Ltd.) that such nitrogen-containing heterocyclic compounds also have a development inhibiting effect in a heat-developable light-sensitive material. However, if the compound of the general formula (I) is initially present in an emulsion layer, development is generally inhibited from the beginning of development, leading to a reduction in image density and a low sensitivity.

When a photographic reagent containing a blocked photographically useful group of, e.g., the compound of the general formula (I) is used and wet development is carried out at a pH greater than 11 from the beginning, the compound of the general formula (I) is inevitably released from the beginning of development under the action of $OH^{\ominus}$. As a result, the density that could be reached and sensitivity are often reduced.

It has been found that when a reagent containing a blocked photographically useful group of the compound of the general formula (I) is used in a heat-developable color light-sensitive material, it can release the compound of the general formula (I) by the action of a base released from a base precursor. In the heat-developable color light-sensitive material of the present invention, a base precursor is first decomposed to release a base. Under the action of the base, development is initiated, and the photographic reagent of the present invention is decomposed by the action of a base at a middle stage to a final stage of development, when the amount of the base formed is increased, thereby releasing a compound of the general formula (I), which has a development inhibiting capability, and stopping the development. Thus, at a suitable time after the start of development, a development inhibitor is released and, as a result, an image can be obtained in which a density that could be reached is not reduced and the S/N ratio is high.

The heat-developable color light-sensitive material of the present invention has a compensation effect for unevenness in the developing temperature. Since the heat-developable light-sensitive material is usually developed at a temperature of 100° C. or more, slight variations in the temperature of the surface of the light-sensitive material cannot be avoided, and these slight variations cause unevenness in image density. That is, in areas where the temperature is high, rate of development is rapid and thus image density is high, while in areas where the temperature is low, rate of development is slow and thus the image density is low. In the heat-developable light-sensitive material of the present invention, however, the above photographic reagent is rapidly released from the compound of the general formula (I) in such high temperature areas and thus the image density is stopped at a given level. On the other hand, in low temperature areas, the opposite occurs, providing an overall compensation effect for temperature unevenness.

In a method of forming an image by heat development using a compound which has a dye portion and releases a mobile dye according to a reduction reaction of silver halide into silver under high temperature conditions, as the developing temperature is increased, such temperature unevenness is greatly increased. In such methods, it is greatly advantageous that a base precursor and a photographic reagent releasing the compound of the general formula (I) are used in combination.

The present invention will hereinafter be explained in detail.

As base precursors, compounds undergoing certain reactions on heating to release a base are preferably used. These compounds include organic acid/base salts which are decomposed with the decarboxylation reaction by heating, and compounds which are decomposed by a reaction (e.g., by an intramolecular nucleophilic substitution reaction, a Lossen rearrangement, or a Beckmann rearrangement), thereby releasing amines. Preferred base precursors include trichloroacetic acid salts as described in British Pat. No. 998,949, c-sulfonylacetic acid salts as described in U.S. Pat. No. 4,060,420, propiolic acid salts as described in Japanese Patent Application No. 55700/83 (corresponding to U.S. Pat. Application Ser. No. 595,121 filed on Mar. 30, 1984), 2-carboxycarboxamide derivatives as described in U.S. Pat. No. 4,088,496, salts of acids decomposing on heating containing, as well as an organic base, an alkali metal and an alkaline earth metal as the base component as described in Japanese Patent Application (OPI) No. 195237/84, hydroxamcarbamates undergoing a Lossen rearrangement as described in U.S. Pat. No. 4,511,650, and aldoxime carbamates releasing nitrile on heating as described in U.S. Pat. No. 4,499,180. In addition, base precursors described in British Pat. No. 998,945, U.S. Pat. No. 3,220,846, Japanese Patent Application (OPI) No. 22625/75, British Pat. No. 2,079,480 and Japanese Patent Application Nos. 155766/84, 172956/84, 173161/84, 173889/84, 176396/84, 176397/84, 176398/84, 176399/84, 176400/84, 176401/84, 176402/84, 176998/84 and 176999/84, are useful.

Representative examples of base precursors which are particularly useful in the present invention are shown below.

Guanidine trichloroacetate, methylguanidine trichloroacetate, potassium trichloroacetate, guanidine phenylsulfonylacetate, guanidine p-chlorophenylsulfonylacetate, guanidine p-methanesulfonylphenylsulfonylacetate, potassium phenylpropiolate, cesium phenylpropiolate, guanidine phenylpropiolate, guanidine p-chlorophenylpropiolate, guanidine 2,4-dichlorophenylpropiolate, diguanidine p-phenylene-bis-propiolate, tetramethylammonium phenylsulfonylacetate, and tetramethylammonium phenylpropiolate.

The amount of the base precursor added can be chosen within a wide range. The amount of the base precursor added is preferably 50 wt % or less, more preferably 0.01 to 40 wt %, based on the total weight of the coated layer.

The above base precursors can be used as mixtures comprising two or more thereof.

Photographic reagents (hereinafter referred to as a "development inhibitor precursor") which release a compound of the general formula (I) (hereinafter referred to merely as "A") under the action of the base released from the above base precursor will hereinafter be described in more detail.

In the compound of general formula (I) represented by A, Y is an atomic group necessary for a 5-, 6- or 9-membered heterocyclic ring. Further, the heterocyclic ring formed by Y contains at least two nitrogen atoms, at least one nitrogen atom and one oxygen atom, or at least one nitrogen atom and one sulfur atom. The heterocyclic ring includes a single ring or a ring which is condensed with a benzene nucleus or a naphthalene nucleus.

Preferred examples of A are shown below, although the present invention is not to be construed as being limited thereto.

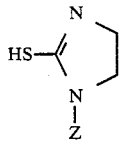

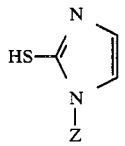

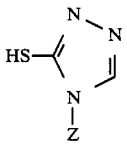

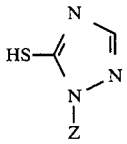

-continued

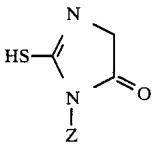

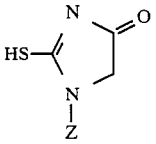

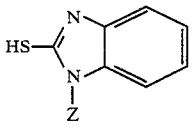

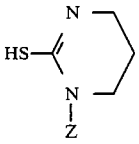

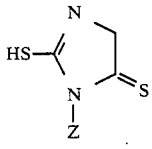

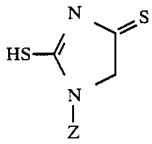

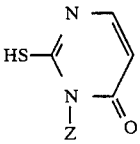

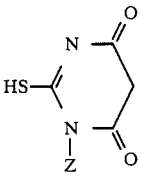

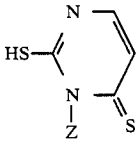

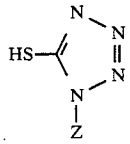

-continued

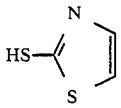

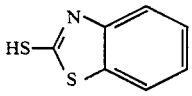

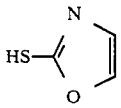

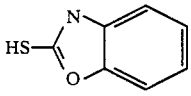

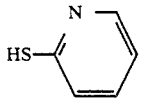

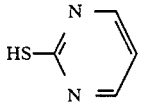

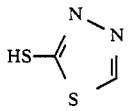

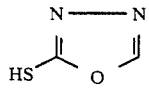

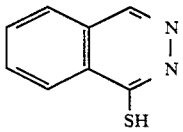

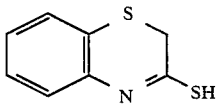

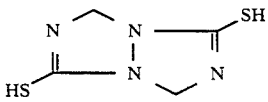

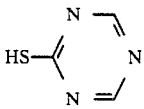

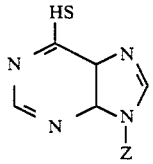

-continued and

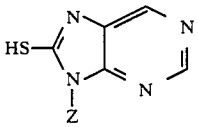

In the above formulae, Z is a hydrogen atom, or a group consisting essentially of at least one group selected from an alkyl group, an aryl group, a cycloalkyl group, an alkenyl group and an aralkyl group, having from 1 to 8 carbon atoms, and preferably a hydrogen atom. Further, these groups may be substituted with a suitable group. Carbon atoms constituting the ring in the formulae may be substituted with a group other than a hydrogen atom.

As photographic reagents capable of releasing the compound of formula (I) used in the present invention, development inhibitor precursors used in the conventional photographic materials are suitable. Of these compounds, the following three types of compounds are preferred.

Type 1

Precursor compounds containing at least one of a group >C=<, a group >C=O, a group >C=S, a group >C=N—, and a group >C=⊖N< and releasing A by the attack of a base released from the base precursor on the carbon atom of the above specified functional group, followed by a reaction releasing A.

The above reaction releasing A after the attack of the base on the carbon atom of the functional group includes (1) releasing A as a result of cleavage of a bond directly bonded to the carbon atom, (2) releasing A as a result of cleavage of another bond associated with the electron transfer, (3) releasing A as a result of cleavage of another bond due to an intramolecular nucleophilic attack with or without electron transfer, (4) releasing A according to a combination of two or more of the above reactions, and (5) releasing A through a timing group.

Type 2

Compounds releasing A as a result of a deprotonation reaction caused by the base released from the base precursor. The general reactions releasing A in these precursor compounds is the same as for compounds of type 1.

Type 3

Compounds containing at least one of a group

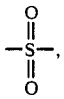

a group

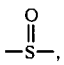

and a group

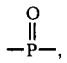

and releasing A as a result of the attack of the base on the sulfur or phosphorus atom of the functional group followed by a reaction releasing A.

The general reactions releasing A in these are the same as for compounds of type 1, with the exception that reactions including direct electron transfer to the sulfur or phosphorus atom are excluded.

Representative examples of precursor compounds belonging to type 1 include sulfur releasing antifoggants and development inhibitor precursors described in, for example, Japanese Patent Publication No. 9968/73, Japanese Patent Application (OPI) Nos. 8828/77, 82834/82, U.S. Pat. Nos. 3,311,474 and 3,615,617; precursors releasing A as a result of cleavage of an acetyl group followed by electron transfer or further by decarboxylation described in U.S. Pat. Nos. 3,674,478, 3,685,991, 3,932,480, 3,993,661, Japanese Patent Application (OPI) Nos. 1140/83 and 209736/83; precursors releasing A as a result of ring cleavage followed by an intramolecular ring closing reaction as described in Japanese Patent Publication No. 22099/82, U.S. Pat. No. 4,199,354, and Japanese Patent Application (OPI) No. 53330/80; precursors releasing A as a result of hydrolysis followed by an intramolecular ring closing reaction as described in U.S. Pat. Nos. 4,358,525 and 4,310,612; precursors releasing A as a result of ring cleavage followed by electron transfer and decarboxylation as described in Japanese Patent Application (OPI) Nos. 179842/82, 3434/84, 137945/84 and 140445/84 and U.S. Pat. Nos. 4,335,200 and 4,350,752; and precursors releasing A as a result of the nucleophilic attack of a base on a carbon-carbon double bond followed by releasing as described in *Research Disclosure,* November, 1976, (RD15162), Japanese Patent Application (OPI) No. 77842/81 and U.S. Pat. No. 4,307,175.

Representative examples of precursor compounds belonging to type 2 include precursors releasing A by a "reverse Michael" reaction as described in Japanese Patent Publication No. 44927/80, U.S. Pat. Nos. 4,009,029, 3,791,830, 3,888,677, Japanese Patent Application (OPI) Nos. 105640/84, 105641/84 and 105642/84; and precursors releasing A with the formation of a quinone methide-like compound as a result of the formation of an anion due to dissociation of >N—H or —OH followed by intramolecular electron transfer as described in U.S. Pat. Nos. 3,685,991, 3,674,478, 3,993,661, 3,932,480 and Japanese Patent Application (OPI) Nos. 976/83 and 1139/83, U.S. Pat. Nos. 4,416,977 and 4,420,554.

Examples of precursor compounds belonging to type 3 include sulfonyl group-containing precursor compounds as described in Japanese Patent Application (OPI) No. 8828/77.

In these precursors, the release of A due to the intramolecular electron transfer or intramolecular nucleophilic attack can be conducted through a suitable timing group. Typical examples are the decarboxylation reaction as described in the above references, and the deformylation reaction as described in U.S. Pat. No. 4,522,917.

Typical development inhibitor precursors are shown below, although the present invention is not to be construed as being limited thereto. In the following formulae, A* is a monovalent group (i.e.,

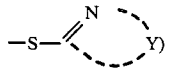

of the compound of formula (I) designated by A bonded through the mercapto sulfur atom thereof, $R^0$ is an aliphatic group, an aryl group, a heterocyclic group, an aryloxy group or a substituted or unsubstituted amino group, having from 1 to 21 carbon atoms, $R^1$ is an aliphatic group, an aryl group or a heterocyclic group, having from 1 to 21 carbon atoms, and $R^2$ is a hydrogen atom, an aliphatic group, an aryl group or a heterocyclic group, having from 1 to 21 carbon atoms.

Type 1

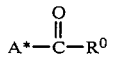

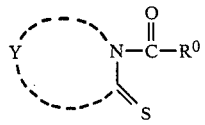

wherein Y is an atomic group necessary to form a 5- or 6-membered nitrogen-containing heterocyclic ring,

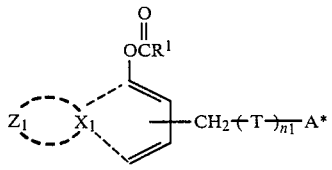

wherein $X_1$ and $Z_1$ are each an atomic group necessary to form a benzene ring, a naphthalene ring, or a condensed 5- or 6-membered nitrogen-containing hetero ring, T is

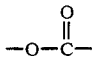

or —$OCH_2$—, and $n_1$ is 0 or 1,

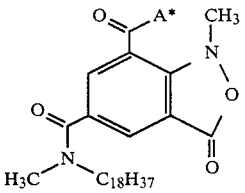

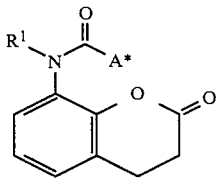

-continued
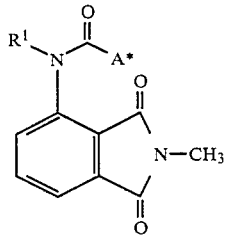
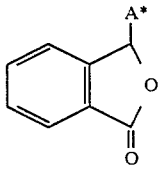
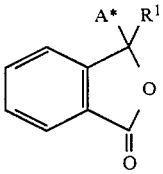
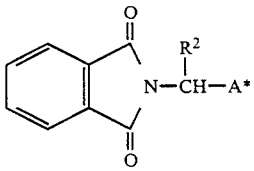
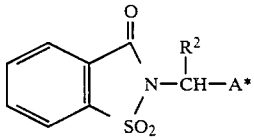
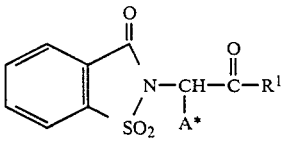
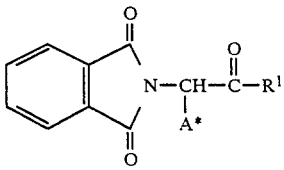
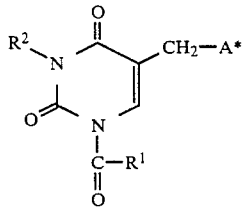
and
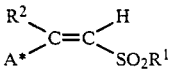
Type 2
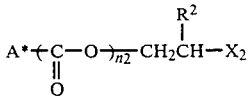
wherein $X_2$ is
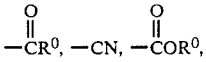
or $—SO_2R^0$, and $n_2$ is 0
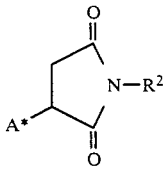
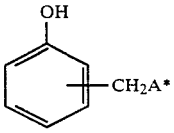
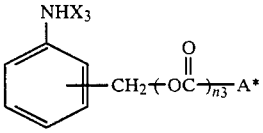
wherein $X_3$
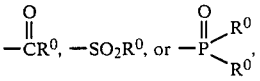
and $n_3$ is 0 or 1,
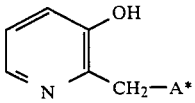
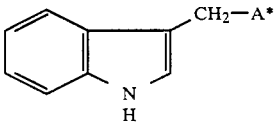
and
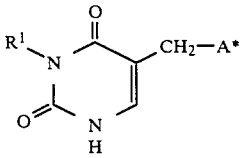
Type 3
$A^*—SO_2R^1$ -continued and

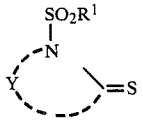

As development inhibitor precursors other than the above compounds, the following examples are given. In the following formulae, $R^3$ is a hydrogen group, a group

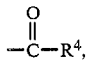

a group

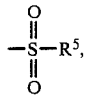

or a group

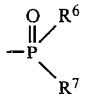

wherein $R^4$, $R^5$, $R^6$ and $R^7$ are each an aliphatic group, an aryl group or a heterocyclic group, having from 1 to 21 carbon atoms), Q is an alkyl group or an aryl group, (TIME) is a timing group which releases—A* after being released from the precursor in the form of—TIME)$_{n4}$—A*, $n_4$ is 0 or a positive integer of 1 to 3, $R^8$ is an aliphatic group, an aryl group, or a heterocyclic group, having from 1 to 21 carbon atoms, $R^9$ is a hydrogen atom, an aliphatic group, an aryl group or a heterocyclic group, having 1 to 21 carbon atoms, Y, $R^1$ and A* is the same as defined above, and $X_4$ is an atomic group necessary for forming an aromatic ring (e.g., a phenyl ring or a naphthalene ring).

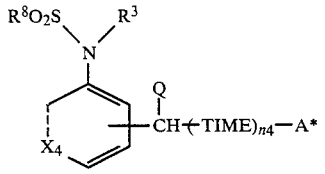

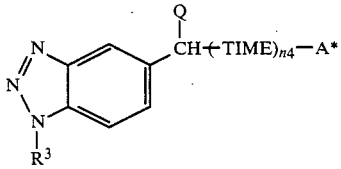

-continued

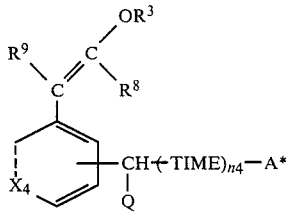

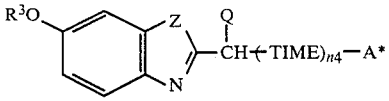

(wherein Z = O or S)

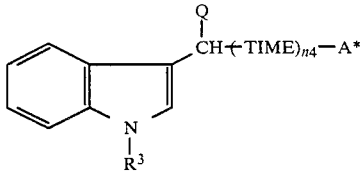

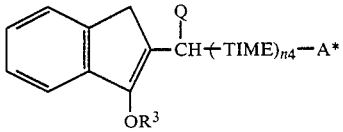

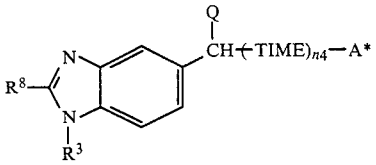

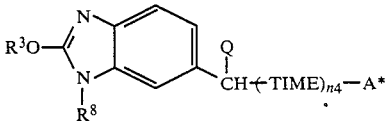

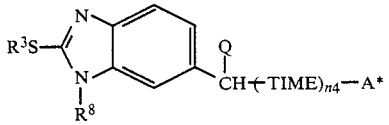

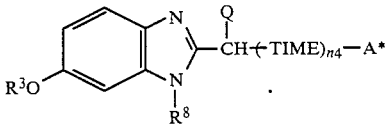

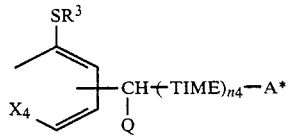

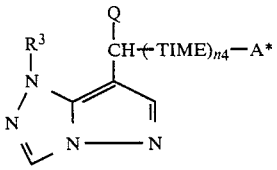

-continued
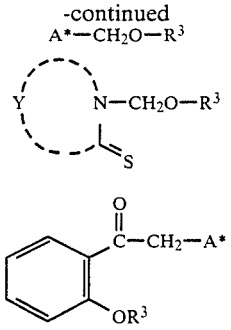
-continued
and
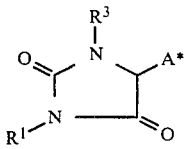
Representative examples of development inhibitor precursors which can be used in the present invention are shown below, although the present invention is not to be construed as being limited thereto.
(1)
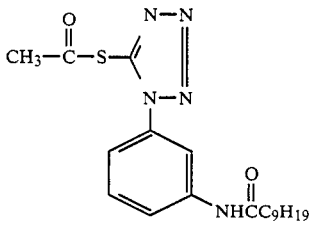
(2)
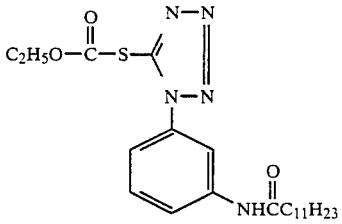
(3)
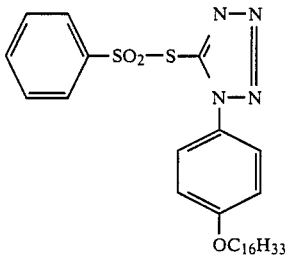
(4)
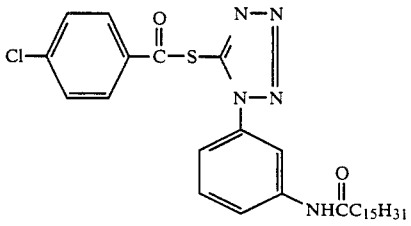

-continued
(5)
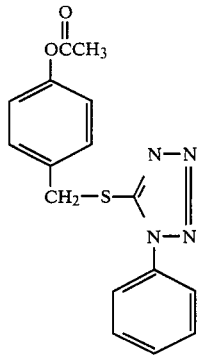
(6)
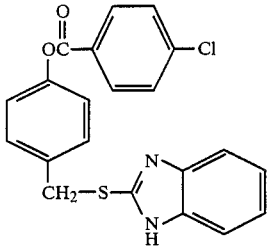
(7)
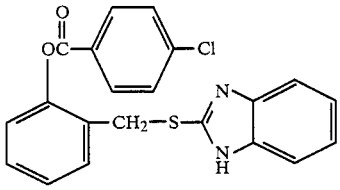
(8)
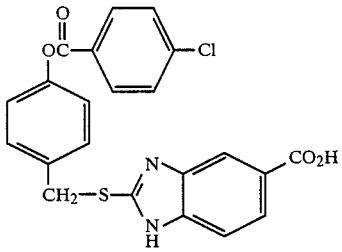
(9)
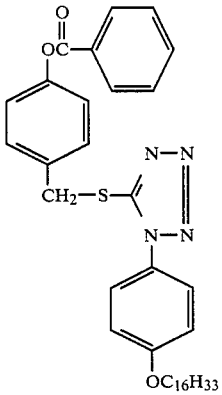

-continued
(10)
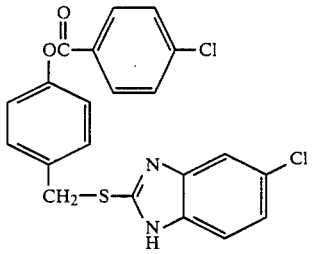
(11)
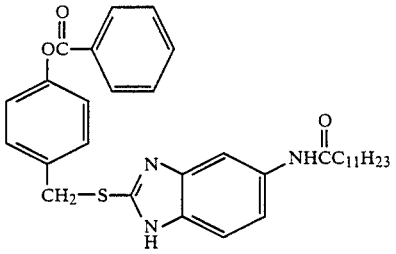
(12)
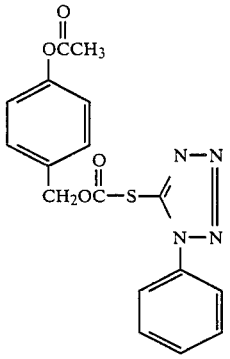
(13)
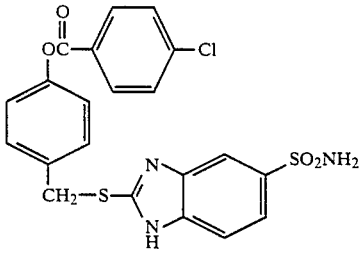
(14)
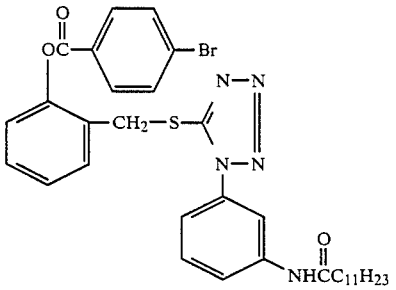

-continued
(15)
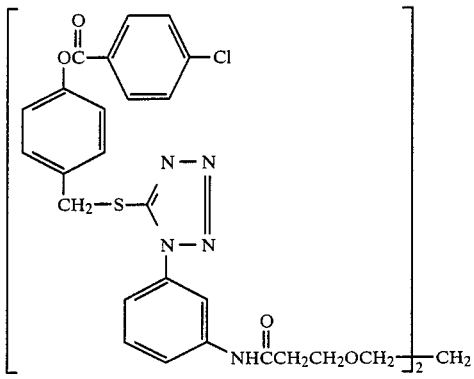
(16)
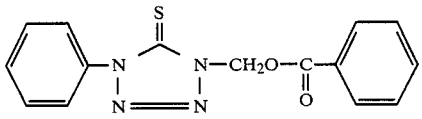
(17)
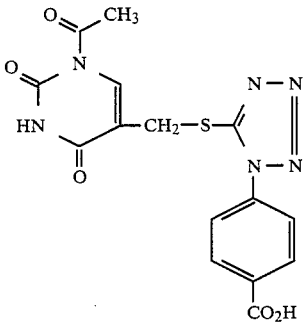
(18)
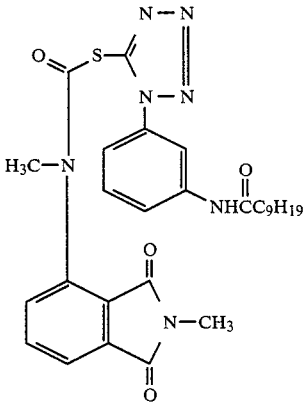
(19)
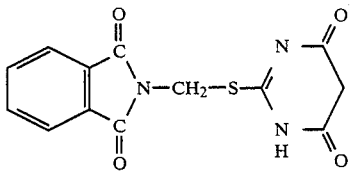
(20)
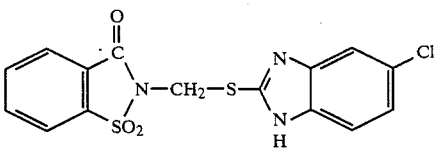

-continued
(21)
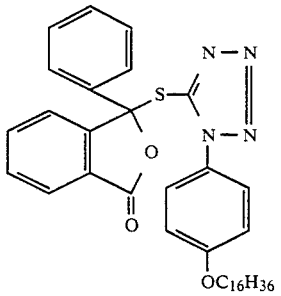
(22)
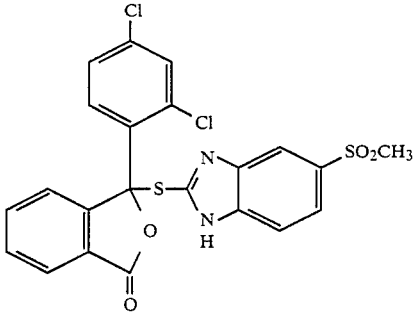
(23)
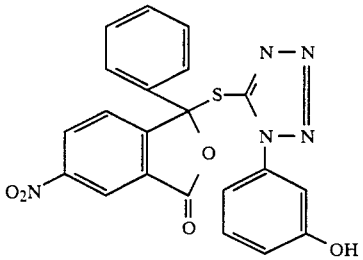
(24)
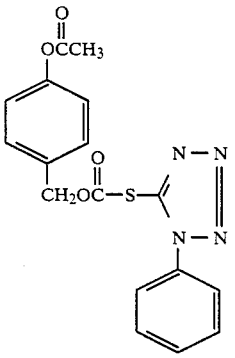
(25)
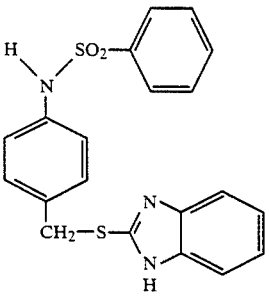

-continued
(26)
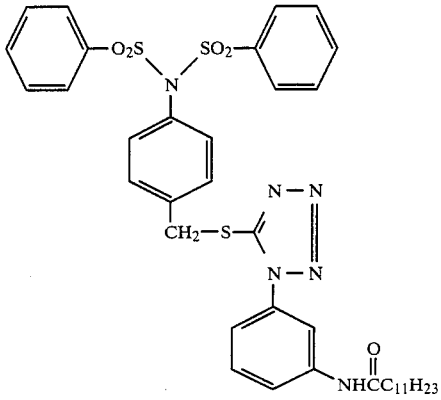
(27)
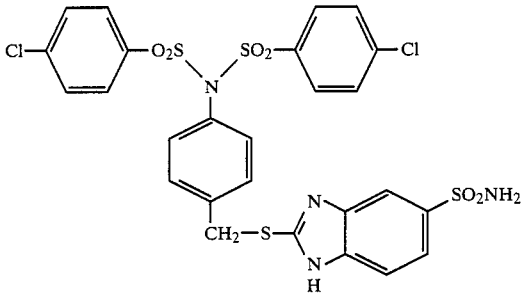
(28)
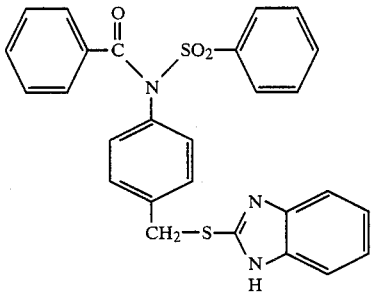
(29)
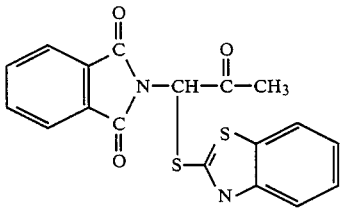
(30)
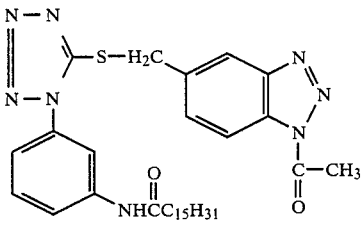
(32)
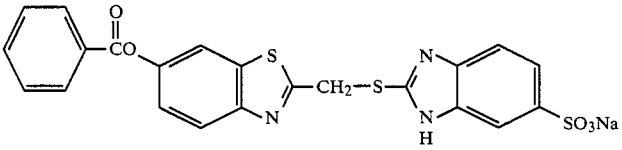

-continued
(33)
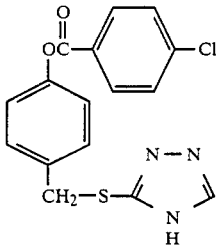
(34)
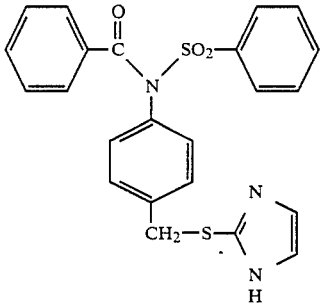
(35)
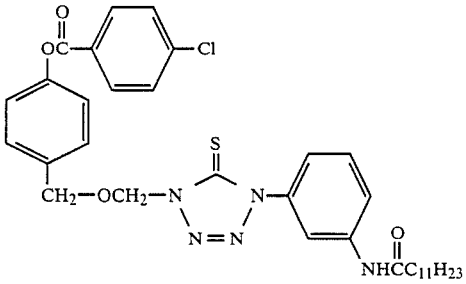
(36)
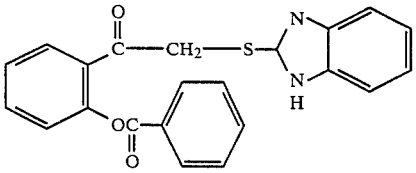
(37)
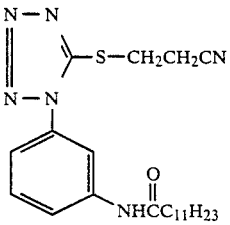
(38)
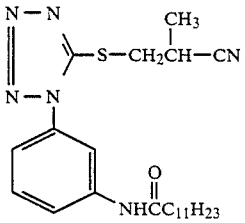
(39)
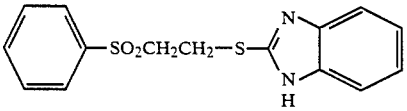

-continued
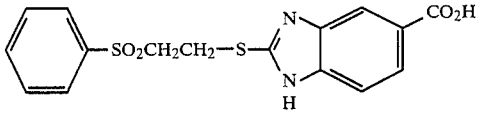
(40)
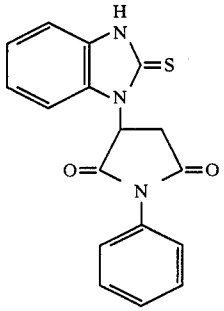
(41)
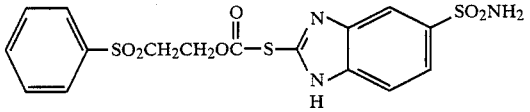
(42)
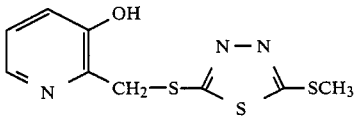
(43)
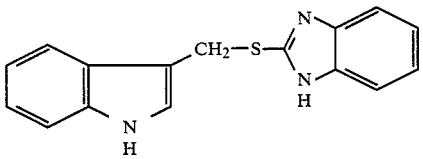
(44)
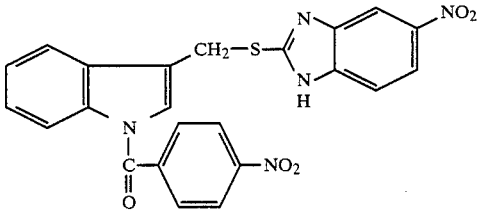
(45)
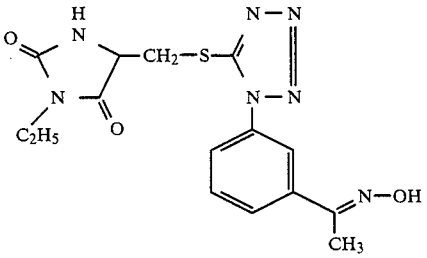
(46)

-continued
(47)
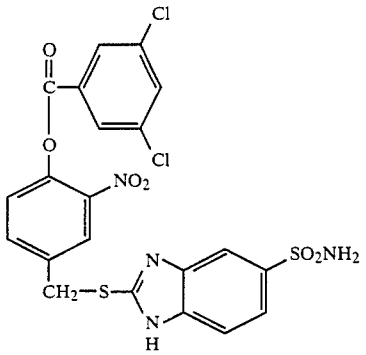
(48)
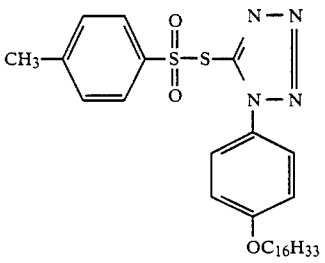
(49)
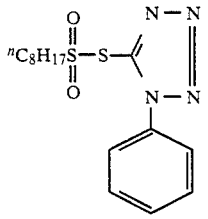
(50)
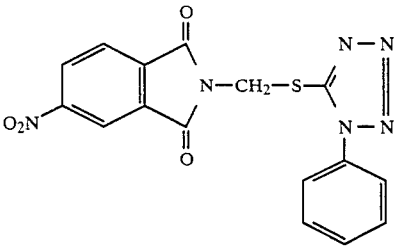
(51)
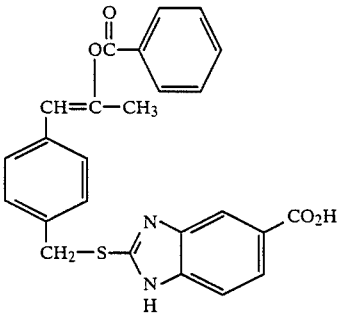

-continued
(52)
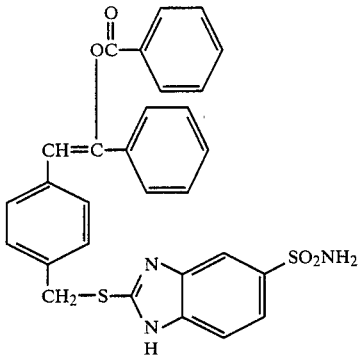
(53)
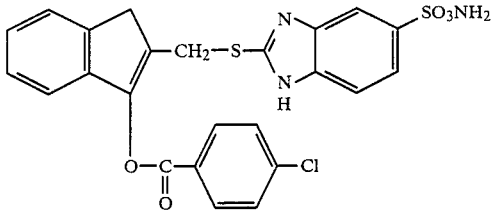
(54)
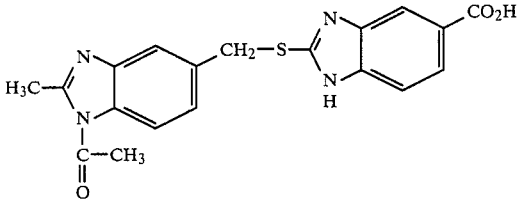
(55)
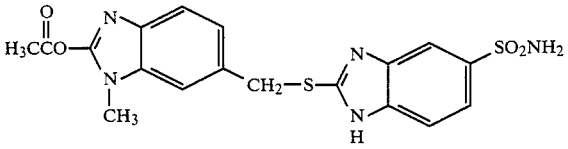
(56)
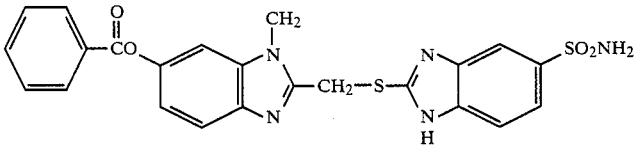
(57)
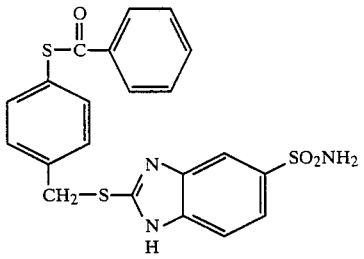
(58)
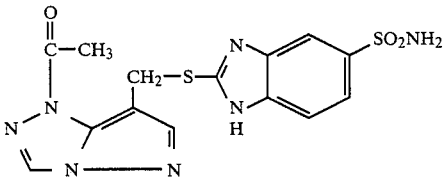

-continued (59)

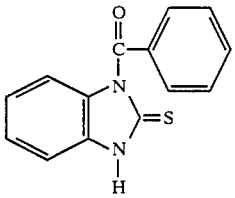

(60)

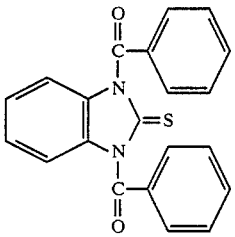

Development inhibitor precursors of the types 1, 2 and 3 as described above can be easily prepared by conventional methods described in the above patents and publications or by conventional methods similar thereto. Several synthesis examples are shown below.

SYNTHESIS EXAMPLE 1

Preparation of Compound (8)

(1) Preparation of p-Chlorobenzoic Acid p-Cresol Ester 400 ml of an acetonitrile solution containing 43.2 g (0.4 mol) of p-cresol and 58.6 ml (0.42 mol) of triethylamine was cooled to less than 10° C., 3.5 g (0.42 mol) of p-chlorobenzoyl chloride was added dropwise to the solution while maintaining it at the above temperature. After the addition was completed, the resulting mixture was allowed to return to room temperature and then stirred for 1 hour. Then, 2 liters of water was added to the reaction solution. Crystals precipitated were separated by filtration, washed with water, and then recrystallized from methanol to yield 88.6 g (0.36 mol) of the desired compound.

(2) Preparation of p-Chlorobenzoic Acid p-Bromomethylphenyl Ester 800 ml of a carbon tetrachloride solution containing 84 g (0.34 mol) of the above prepared p-chlorobenzoic acid p-cresol ester, 50 g (0.28 mol) of N-bromosuccinimide, and benzoyl peroxide as a radical initiator was refluxed for 1 hour while irradiating with light. Then, crystals of succinimide precipitated were filtered while the reaction solution was hot. The mother liquor was condensed under reduced pressure. The residue was dissolved in ethyl acetate, washed with water, and then separated. The ethyl acetate phase was dried over sodium sulfate. Ethyl acetate was concentrated under reduced pressure, and the residue was recrystallized from a mixed solvent of n-hexane and ethyl acetate (v/v=2/1) to yield 63.2 g (0.194 mol) of the desired compound.

(3) Preparation of Compound (8)

300 ml of a methanol solution containing 29.1 g (0.15 mol) of 2-mercaptobenzimidazole-5-carboxylic acid, and 57.9 g (0.3 mol) of a 28 wt % methanol solution of (0.165 mol) of the above bromo compound was added to the solution in small portions. After the addition was completed, the resulting mixture was stirred for 1 hour and then cooled to room temperature. The sodium salt of the desired compound precipitated was separated by filtration and then washed with methanol.

Crude crystals of the sodium salt were mixed with 1.5 liters of methanol, 1 liter of acetone, and 100 ml of water and further with 6 g of active carbon, and the resulting mixture was stirred under reflux. The active carbon was removed by filtration using sellaite. To the filtrate was added 10 ml of hydrochloric acid, and the mixture was cooled with water. The crystals precipitated were separated by filtration and then washed with methanol to yield 23.1 g (0.053 mol) of the desired compound, Compound (8), m.p.: 292° C. (decomposition). The yield was 35%.

SYNTHESIS EXAMPLE 2

Preparation of Compound (26)

(1) Preparation of N-Benzenesulfonyl-p-toluidine 200 ml of an acetonitrile solution containing 32.1 g (0.3 mol) of p-toluidine and 26 ml (0.32 mol) of pyridine was stirred while maintaining it at a temperature of less than 25° C., and 54.7 g (0.31 mol) of benzenesulfonyl chloride was added dropwise thereto. After the addition was completed, the mixture was further stirred for 1 hour and then the reaction solution was added to 1 liter of water. The precipitate formed was extracted with ethyl acetate and then the extract was separated. The ethyl acetate phase was washed with a saline solution and dried over sodium sulfate. The ethyl acetate was distilled off under reduced pressure to yield 74.3 g (0.3 mol) of the desired compound. This compound was used in the subsequent step without purification.

(2) Preparation of N,N-Dibenzylsulfonyl-p-toluidine

A solution consisting of 74.3 g of the above prepared N-benzylsulfonyl-p-toluidine, 13 g (0.3 mol) of sodium hydroxide, 300 ml of water, and 200 ml of acetonitrile was heated to 50° C., and 84.7 g (0.48 mol) of benzenesulfonyl chloride was added dropwise thereto while stirring. At a later stage of the dropping process, the reaction solution became neutral or acidic; that is, its pH dropped to 7 or less. For this reason, a 3N aqueous solution of sodium hydroxide was added to maintain the pH of the reaction solution at 10 or more. When a reduction in pH was no longer observed, the reaction solution was neutralized with hydrochloric acid, cooled to 20° C. and then a precipitate was filtered off and washed with water. The crystals thus obtained contained a small amount of oily material. On washing the crystals with methanol, 93.4 g (0.24 mol) of the desired product was obtained in a pure form.

(3) Preparation of N,N-Dibenzenesulfonyl-p-bromomethylaniline 500 ml of a carbon tetrachloride solution containing 46.4 g (0.12 mol) of toluidine, 17.8 g (0.1 mol) of N-bromosuccinimide, and benzoyl peroxide as a radical initiator was refluxed for 1 hour while irradiating with light. Then, crystals of succinimide precipitated were separated by filtration while the reaction solution was hot, and the mother liquor was distilled off under reduced pressure. When the mother liquor solution was reduced to about 200 ml, distillation was stopped, and 200 ml of ethyl acetate and 40 ml of n-hexane were added thereto. The resulting mixture was cooled. Crystals precipitated were separated by filtration and then washed with a mixed solvent of ethyl acetate and methanol to yield 29.7 g (0.064 mol) of the desired product.

(4) Preparation of Compound (26)

80 ml of a methanol solution containing 10.43 g (0.03 mol) of 1-(m-lauroylaminophenyl)-5-mercaptotetrazole, and 5.79 g (0.03 mol) of a 28 wt % methanol solution of sodium methylate was stirred at room temperature, and 14 g (0.03 mol) of the above prepared bromo compound was added thereto in small portions. Then, the resulting mixture was stirred at room temperature for 30 minutes and further stirred under reflux for 5 minutes, and then cooled with ice. The crystals precipitated were separated by filtration.

The crude crystals thus obtained were recrystallized from a mixed solvent of methanol and ethanol (v/v=1/1) to yield 17.2 g (0.0227 mol) of the desired product, m.p.: 129°-131° C. The yield was 76%.

SYNTHESIS EXAMPLE 3

Preparation of Compound (39)

(1) Preparation of 2-Phenylsulfonylethanol 1,000 ml of an aqueous solution containing 509 g (2.16 mol) of sodium benzenesulfonate (dihydrate) was heated to 80°-90° C. and stirred. To this solution were added at the same time 539 g (4.31 mol) of ethylenebromohydrin and 100 ml of an aqueous solution containing 45 g of sodium hydroxide while maintaining the pH of the reaction solution at 7-8. After the addition was completed, the reaction solution was further stirred for 2 hours at 80°-90° C. and then cooled to room temperature. Then, the reaction solution was extracted with ethyl acetate. The ethyl acetate was concentrated and distilled off under reduced pressure to yield 113 g of the desired product having a boiling point of 172 to 174° C./0.4 mmHg.

(2) Preparation of 2-Phenylsulfonylethylmethane Sulfonate 200 ml of a pyridine solution containing 27.9 g (0.15 mol) of the above prepared alcohol was stirred while cooling with ice, and 12.8 ml (0.165 mol) of methanesulfonyl chloride was added dropwise at a temperature of 10° C. or less. After the addition was completed, the reaction solution was further stirred at room temperature for 1 hour and then added to a 5 wt % aqueous hydrochloric acid solution. The crystals precipitated were separated by filtration and then washed with water to yield 28.3 g of the desired product.

(3) Preparation of Compound (39)

80 ml of a toluene solution containing 20.9 g (0.079 mol) of the above prepared methanesulfonic acid ester and 10.7 g (0.071 mol) of 2-mercaptobenzimidazole was refluxed for 2.5 hours on an oil bath. When the reaction solution was cooled to room temperature, an insoluble viscous material was precipitated to the bottom of the reaction vessel. The supernatant solution of toluene was removed by decantation, and the precipitated material was dissolved in ethyl acetate. The resulting ethyl acetate phase was washed with aqueous solution of sodium hydrogencarbonate and then concentrated under reduced pressure. The residue was purified by flash column chromatography (silica gel; chloroform/ethyl acetate=10/1) to yield 18.3 g (0.057 mol) of Compound (39), m.p.: 132°-133° C. The yield was 81%.

The amount of the development inhibitor precursor used in the photographic element according to the invention varies depending on the type of the precursor or the system in which it is used. In general, it is not more than about 50 wt %, preferably not more than about 30 wt %, based on the total weight of the coated layer. The optimum amount greatly varies depending on the structure of the development inhibitor (I) being released. Some development inhibitors (I), when used in a small amount, accelerate development, whereas when used in a large amount, inhibit development. Thus, when precursors releasing such compounds (I) are added, the initial development is accelerated and the latter half of development is inhibited. Thus, the addition of such precursors is advantageous.

The development inhibitor precursor of the present invention is first dissolved in an organic solvent soluble in water (e.g., methanol, ethanol, acetone, and dimethylformamide) or a mixed solution of the organic solvent and water and then incorporated in a binder.

The development inhibitor precursor of the present invention can also be incorporated in a binder in the form of finely divided particles.

The development inhibitor precursors of the present invention can be used as mixtures comprising two or more thereof.

The base precursor and development inhibitor precursor of the present invention can be added to a light-sensitive layer and/or an image receiving layer of the photographic material. The term "light-sensitive layer" as used herein means a heat-developable light-sensitive element or a light-sensitive photographic layer, and also a laminated colloid layer which contains at least one silver halide emulsion layer and may contain an interlayer, a protective layer. A light-insensitive backing layer may be provided on the opposite side of the support from the light-sensitive layer. The term "image receiving layer" which is used herein means an image receiving element, further may be a coating layer of a dye fixing element. The base precursor and the development inhibitor precursor may be added to the same layer or to different layers of the photographic material. It is preferred that they are both added to a silver halide emulsion layer.

The term "heat-developable photographic element" as used in the present invention includes both the above heat-developable light-sensitive element and the optionally used dye fixing element, if desired.

The heat-developable light-sensitive element of the present invention has at least light-sensitive silver halide, a binder, a base precursor and a photographic reagent capable of releasing a compound of general formula (I) and a reducing agent on a support. When it is capable of forming a color image, a dye providing substance releasing or forming a mobile dye on heating is added. In this case, the dye providing substance may have function as a reducing agent.

A light-sensitive element and a dye fixing element are essential for the system capable of forming an image by diffusion transfer. These photographic materials generally can be divided into two groups: a system in which the light-sensitive element and the dye fixing element are coated on different supports, and a system in which the light-sensitive element and the dye fixing element are coated on the same support.

The system in which the light-sensitive element and the dye fixing element are provided on different supports can further be divided into two groups. One is a type permitting the light-sensitive element and the dye fixing element to be peeled apart from each other, and the other is a unitary type that does not permit the two elements to be separated. In the former type, after imagewise exposure or heat development, the coating surface of the light-sensitive element and the coating surface of the dye fixing element are brought into contact to transfer an image, and after this image transfer, the light-sensitive element is quickly separated from the dye fixing layer. Depending on whether the final image is of the reflection type or of the transmission type, an opaque or transparent support is selected as the support of the image fixing element. If desired, a white reflection layer may be provided. In the latter non-peel-apart material, it is necessary for a white reflection layer to be present between the light-sensitive layer of the light-sensitive element and the dye fixing layer of the dye fixing element. This white reflection layer may be provided on the light-sensitive element or the dye fixing element. It is also necessary for the support of the dye fixing element to be transparent.

Hereinafter, when the dye fixing element is present on a support different from that of the light-sensitive element, it is sometimes called a "dye fixing material".

The light-sensitive element or dye fixing element may contain an electrically conductive heat generator layer as a heating means for heat development or diffusion transfer of dye.

In order to obtain a wide variety of colors using the three primary colors of yellow, magenta and cyan, the light-sensitive element of the present invention is required to have at least three silver halide emulsion layers having light sensitivities in different spectral regions.

Typical combinations of at least three light-sensitive silver halide emulsions having light sensitivities in different spectral regions are a combination of a blue-sensitive emulsion layer, a green-sensitive emulsion layer, and a red-sensitive emulsion layer; a combination of a green-sensitive emulsion layer, a red-sensitive emulsion layer, and an infrared light-sensitive emulsion layer; a combination of a blue-sensitive emulsion layer, a green-sensitive emulsion layer, and an infrared light-sensitive emulsion layer; and a combination of a blue-sensitive emulsion layer, a red-sensitive emulsion layer, and an infrared light-sensitive emulsion layer. The infrared light-sensitive emulsion layer is an emulsion layer having a sensitivity to light with a wavelength of more than about 700 nm, particularly more than about 740 nm.

In the light-sensitive element of the present invention, if necessary, an emulsion layer having light-sensitivity in a single spectral region may be divided into two or more layers depending on the degree of sensitivity to light of the emulsion.

In such materials, it is necessary for a light-insensitive hydrophilic colloid layer adjacent to the spectrally sensitized emulsion layer (and/or the emulsion layer itself) to contain a dye providing substance capable of releasing or forming a dye, including a yellow hydrophilic dye, a magenta hydrophilic dye, and a cyan hydrophilic dye. In other words, it is necessary for a light-insensitive hydrophilic colloid layer adjacent to each emulsion layer (and/or the emulsion layer itself) to contain a dye providing substance releasing or forming a hydrophilic dye having a different color. If desired, two or more dye providing substances of the same color may be used as a mixture. Particularly when the dye providing substance is initially colored, it is advantageous that the dye providing substance be added to a layer adjacent to the emulsion layer.

In the light-sensitive element of the present invention, if necessary, other auxiliary layers such as a protective layer, an intermediate layer, an antistatic layer, a curl preventing layer, a peeling layer, and a matting layer may be provided.

Particularly, a protective layer (PC) usually contains an organic or inorganic matting agent layer for the prevention of adhesion. The protective layer may further contain a mordant, a UV absorbing agent. The protective layer and the intermediate layer may each be composed of two or more layers.

In the intermediate layer may be incorporated a reducing agent for prevention of color mixing, a UV absorbing agent, and a white pigment (e.g., $Ti_{02}$) The white pigment may be added not only to the intermediate layer but also to the emulsion layer for the purpose of increasing sensitivity.

In order to provide the silver halide emulsions with each light sensitivity described above, it is sufficient that each silver halide emulsion be subjected to dye sensitization using a known sensitizing dye to obtain the desired spectral sensitivity.

The dye fixing element that is used in the present invention has at least one layer containing a mordant. When the dye fixing layer is the top layer of the dye fixing element, if necessary, a protective layer may be further provided thereon.

Moreover, to incorporate a dye transfer aid sufficiently, if necessary, or to control the dye transfer aid, a water-absorbing layer or a dye transfer aid-containing layer may be provided. These layers may be adjacent to the dye fixing layer or may be separated through an intermediate layer.

The dye fixing layer that is used in the present invention may be composed of two or more layers containing mordants having different mordanting capacities, if necessary.

In the dye fixing element of the present invention, if necessary, as well as the above described layers, other auxiliary layers such as a peeling layer, a matting agent layer, and a curl preventing layer may be provided. In one or more of the above layers, a base and/or a base precursor for acceleration of dye transfer, an anticorrosion agent for preventing color mixing of hydrophilic heat solvent dyes, a UV absorbing agent, a dispersing vinyl compound, a brightening agent, and other conventional additives may be incorporated.

The dye fixing element may include, if necessary, as well as the above layers, a reflection layer containing a white pigment (e.g., titanium oxide), a neutralizing layer, a neutralization timing layer, and so forth. These layers may be coated not only on the dye fixing element but also on the light-sensitive element. The reflection layer, neutralizing layer, and neutralization timing layer are described in, for example, U.S. Pat. Nos. 2,983,606, 3,362,819, 3,362,821, 3,415,644 and Canadian Pat. No. 928,559.

It is advantageous for the dye fixing element of the present invention to contain a transfer aid as described hereinafter. This transfer aid may be added to the dye fixing layer or another layer.

Silver halide which can be used in the light-sensitive element of the present invention includes silver chloride, silver bromide, silver iodide, silver chlorobromide, silver chloroiodide, silver iodobromide and silver chloroiodobromide. This silver halide may have a structure in which the halogen composition is uniform throughout the particle, or a multiple structure in which the halogen composition is different between the surface layer and the inside portion, as disclosed in Japanese Patent Application (OPI) Nos. 154232/82, 108533/83, 48755/84 and 52237/84, U.S. Pat. No. 4,433,048, and European Pat. No. 100,984. Tabular grains having a thickness of not more than about 0.5 μm, a diameter of at least about 0.6 μm, and an average aspect ratio of at least about 5, as disclosed in U.S. Pat. Nos. 4,414,310 and 4,435,499, and West German Patent Application (OLS) No. 3,241,646A1, and single dispersion emulsions having a nearly uniform grain size distribution as described in Japanese Patent Application (OPI) Nos. 178235/82,100846/83, and 14829/83, International Publication No. 3/02338A1, European Pat. Nos. 64,412A3 and 83,377A1 can also be used in the present invention. Two or more silver halides which are different in crystal habit, halogen composition, grain size, grain size distribution, and other properties may be used in combination. Two or more single dispersion emulsions having different grain sizes can be mixed to thereby control gradation.

In connection with the grain size of the silver halide which is used in the present invention, the average grain size is preferably about 0.001 to 10 μm and more preferably about 0.001 to 5 μm. These silver halide emulsions may be prepared by any of the acid method, the neutral method, and the ammonia method. A soluble silver salt and a soluble halogen salt can be reacted by any of the single jet method, the double jet method, and a combination thereof. In addition, the reverse mixing method in which grains are formed in the presence of an excess of silver ions, and the controlled double jet method in which pAg is kept constant can be employed. In order to accelerate the growth of grains, the concentration of silver salt or halogen salt added, the amount of silver salt or halogen salt added, or the rate of addition of silver salt or halogen salt may be increased, as disclosed in Japanese Patent Application (OPI) Nos. 142329/80, 158124/80 and U.S. Pat. No. 3,650,757.

Silver halide grains of the epitaxial overgrown type can also be used, such as those described in Japanese Patent Application (OPI) No. 16124/81 and U.S. Pat. No. 4,094,684.

When light-sensitive silver halide is used without the use of an organosilver salt oxidizing agent in combination, it is preferred to use silver chloroiodide, silver iodobromide, and silver chloroiodobromide in which an X-ray pattern of silver iodide crystal can be observed.

For example, silver iodobromide having the above characteristics can be obtained by adding a silver nitrate solution to a potassium bromide solution to thereby prepare silver bromide grains and then further adding potassium iodide thereto.

In the course of formation of silver halide particles, as silver halide solvents, ammonia, organic thioether derivatives as described in Japanese Patent Publication No. 11386/72, and sulfur-containing compounds as described in Japanese Patent Application (OPI) No. 144319/78 can be used.

In the process of formation of silver halide grains or their physical ripening, cadmium salts, zinc salts, lead salts, thallium salts, and the like may be present.

For the purpose of improving high intensity reciprocity law failure, low intensity reciprocity law failure, water-soluble iridium salts such as iridium (III or IV) chloride and hexachloroiridium acid ammonium, and water-soluble rhodium salts such as rhodium chloride can be used.

The silver halide emulsion, after the formation of precipitate or physical ripening, may be freed of soluble salts. For this purpose, the noodle washing method and the precipitation method can be employed.

The silver halide emulsion may primitively be used. Usually, however, it is chemically sensitized. In the case of emulsions for ordinary light-sensitive materials, known sensitizing methods such as sulfur sensitization, reduction sensitization, and noble metal sensitization can be applied alone or in combination with each other. These chemical sensitizations can be carried out in the presence of nitrogen-containing heterocyclic compounds disclosed in Japanese Patent Application (OPI) Nos. 126526/83 and 215644/83.

The silver halide emulsion used in the present invention may be of the surface latent image type in which a latent image is formed mainly on the surface of grains, or of the internal latent image type in which a latent image is formed in the interior of the grains. A direct reversal emulsion in which an internal latent image type emulsion and a nucleating agent are used in combination can be used. Internal latent image type emulsions suitable for this purpose are described in, for example, U.S. Pat. Nos. 2,592,250 and 3,761,276, Japanese Patent Publication No. 3534/83, and Japanese Patent Application (OPI) No. 136641/82. Nucleating agents preferably used in combination in the present invention are described in, for example, U.S. Pat. Nos. 3,227,552, 4,245,037, 4,255,511, 4,266,031 and 4,276,364, and German Patent Application (OLS) No. 2,635,316.

The amount of light-sensitive silver halide coated is, calculated as silver, from about 1 to 10 $g/m^2$.

In the present invention, organometallic salts which are relatively stable against light can be used as oxidizing agents in combination with light-sensitive silver halide. In this case, it is necessary for light-sensitive silver halide and an organometallic salt to be in contact with each other or be closely associated. Of these organometallic salts, organosilver salts are particularly preferred. In the case in which such organometallic salts are used in combination with a light-sensitive silver halide, it is considered that when the heat-developable light-sensitive material is heated at from 80°to 250° C., the organometallic oxidizing agent participates in a redox reaction with the latent image of exposed silver halide as catalyst.

Organic compounds which can be used to form the above organosilver salt oxidizing agents include aliphatic or aromatic carboxylic acids, mercapto group-or α-hydrogen-containing thiocarbonyl group-containing compounds, and imino group-containing compounds.

Typical examples of the silver salts of aliphatic carboxylic acids include the silver salts of behenic acid, stearic acid, oleic acid, lauric acid, capric acid, myristic acid, palmitic acid, maleic acid, fumaric acid, tartaric acid, furonic acid, linolic acid, linoleic acid, oleic acid, adipic acid, sebacic acid, succinic acid, acetic acid, butyric acid, and camphoric acid. In addition, the silver salts of halogen atom- or hydroxyl group-substituted fatty acids, and thioether group-containing aliphatic carboxylic acids can be used.

Typical examples of the silver salts of aromatic carboxylic acids and other carboxyl group-containing compounds include the silver salts of benzoic acid, 3,5-dihydroxybenzoic acid, o-, m- or p-methylbenzoic acid, 2,4-dichlorobenzoic acid, acetamidobenzoic acid, p-phenylbenzoic acid, gallic acid, tannic acid, phthalic acid, terephthalic acid, salicylic acid, phenylacetic acid, pyromellitic acid, and 3-carboxymethyl4-methyl-4-thiazoline-2-thione.

Typical examples of the silver salts of mercapto- or thiocarbonyl group-containing compounds include the silver salts of mercapto compounds described in U.S. Pat. No. 4,123,274, such as 3-mercapto-4-phenyl 1,2,4-triazole, 2-mercaptobenzimidazole, 2-mercapto-5-aminothiadiazole, 2-mercaptobenzothiazole, S-alkylthioglycolic acid (wherein the number of carbon atoms in the alkyl group is from about 12 to 22), dithiocarboxylic acids such as dithioacetic acid, thiamides such as thiostearoamide, 5-carboxyl-1-methyl-2-phenyl-4-thiopyridine, mercaptotriazine, 2-mercaptobenzooxazole, mercaptooxadiazole, and 3-amino-5-benzylthio-1,2,4-triazole.

Typical examples of the silver salts of imino group-containing compounds include the silver salts of benzotriazole or its derivatives as described in Japanese Patent Publication Nos. 30270/69 and 18416/70, such as benzotriazole, alkyl-substituted benzotriazoles (e.g., methylbenzotriazole), halogen-substituted benzotriazoles (e.g., 5-chlorobenzotriazole), and carboimidobenzotriazoles (e.g., butylcarboimidobenzotriazole), nitrobenzotriazoles as described in Japanese Patent Application (OPI) No. 118639/83, sulfobenzotriazole, carboxybenzotriazole or its salts, and hydroxybenzotriazole as described in Japanese Patent Application (OPI) No. 118638/83, and 1,2,4-triazole, 1H-tetrazole, carbazole, saccharin, imidazole and its derivatives as described in U.S. Pat. No. 4,220,709.

Silver salts and organometallic salts other than the silver salts, such as copper stearate, as described in *Research Disclosure,* 17029 (June, 1978), and the silver salts of alkyl group-containing carboxylic acids such as phenylpropionic acid as described in Japanese Patent Application No. 221535/83 (corresponding to U.S. Patent Application Ser. No. 675,040, filed on Nov. 26, 1984) can be used in the present invention.

The amount of the organometallic salt used is typically from about 0.01 to 10 mols, preferably about 0.01 to 1 mol, per mol of light-sensitive silver halide. The total amount of light-sensitive silver halide and organosilver salt being coated is appropriately from about 50 to 10 g/m$^2$.

The photographic element according to the present invention contains a dye providing substance, i.e., a compound which, when light-sensitive silver halide is reduced into silver under high temperature conditions, forms or releases a mobile dye in a positive or negative relation to the reaction.

The dye providing substance is now explained in greater detail.

An example of the dye providing substance which can be used in the present invention is a coupler capable of reacting with a developing agent. In a system using such couplers, the coupler reacts with an oxidized product of the developing agent resulting from the oxidation reduction reaction of the silver salt and the developing agent, thereby forming a dye. This system is well known, and representative examples of the developing agent and coupler are described in detail in, for example, T. H. James, *The Theory of the Photographic Process,* pp. 291–334 and 354–361 (4th Ed.), and Shinichi Kikuchi, *Photographic Chemistry,* pp. 284–295 (4th Ed., Kyoritsu Shuppan Co., Ltd.).

Dye-silver compounds comprising an organosilver salt and a dye bonded together are also suitable dye providing substances. Representative examples of such dye-silver compounds are described in *Research Disclosure,* May 1978, pp. 54–58 (RD-16966).

Azo dyes conventionally used in the heat-developable silver-dye bleaching method are also useful dye providing substances in the present invention. Representative examples of such azo dyes and a bleaching method are described in U.S. Pat. No. 4,235,957, and *Research Disclosure,* April 1976, pp. 30–32 (RD-14433).

Leuco dyes as described in, for example, U.S. Pat. Nos. 3,985,565 and 4,022,617 are also useful dye providing substances.

Other examples of the dye providing substances are compounds having a capability to release or diffuse a diffusible dye in an imagewise pattern represented by the following general formula (LI):

$$(\text{Dye-X}_0)_{n_0}\text{Y}_0 \qquad \text{(LI)}$$

wherein Dye is a dye or dye precursor group, $X_0$ is a chemical bonding or connecting group, $Y_0$ is a group which produces a difference in diffusibility between the compound of the general formula: $(\text{Dye-X}_0)_{n_0}\text{Y}_0$ in a positive or negative relation to a light-sensitive silver salt having an imagewise latent image, or which releases Dye and produces a difference in diffusibility between the released Dye and $(\text{Dye-X}_0)_{n_0}\text{Y}_0$, and $n_0$, is 1 or 2, provided that when $n_0$ is 2, the two Dye-$X_0$ groups may be the same or different.

As representative examples of the dye providing substance of the general formula (LI), for example, dye developing agents comprising a hydroquinone-based developing agent and a dye component bonded together are described in U.S. Pat. Nos. 3,134,764, 3,362,819, 3,597,200, 3,544,545 and 3,482,972. Substances releasing a diffusible dye by an intramolecular nucleophilic substitution reaction are described in Japanese Patent Application No. 63618/76, and substances releasing a diffusible dye by an intramolecular rearrangement reaction of an isooxazolone ring are described in Japanese Patent Application (OPI) No. 111628/74. In all of these systems, a diffusible dye is released or diffused in areas where development does not occur, and the dye is neither released nor diffused in areas where development occurs.

In these systems, development and the release or diffusion of dye are carried out at the same time and, therefore, it is very difficult to obtain an image having a high S/N ratio. In order to overcome this problem, an improved system has been proposed in which a dye releasing compound is converted into an oxidation product not having a dye releasing capability and is used in combination with a reducing agent or its precursor and, after development, the oxidized dye releasing compound is reduced by the reducing agent remaining unoxidized to thereby make it release a diffusible dye. Representative examples of dye providing substances as used in this system are described in Japanese Patent Application (OPI) Nos. 110827/78, 130927/79, 164342/81 and 35533/78.

As substances releasing a diffusible dye in areas where development occurs, substances releasing a diffusible dye by a reaction between a coupler having a diffusible dye as a releasing group and an oxidation product of a developing agent are described in, for example, British Pat. No. 1,330,524, Japanese Patent Publication No. 39165/83, and U.S. Pat. No. 3,443,940, and substances forming a diffusible dye by a reaction between a coupler having a nondiffusing group as a releasing group and an oxidation product of a developing agent are described in, for example, U.S. Pat. No. 3,227,550.

A serious problem encountered in the system using these color developing agents is stain of the image produced due to decomposition products of the developing agent by oxidation. In order to overcome this problem, dye releasing compounds which do not need a developing agent and have reducing properties by themselves have been developed.

Typical examples of the compounds are shown below along with patents or publications describing the substituents shown.

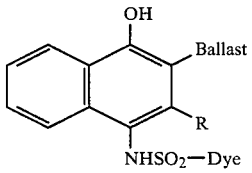

U.S. Pat. No. 3,928,312

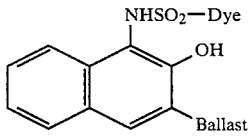

U.S. Pat. No. 4,053,312

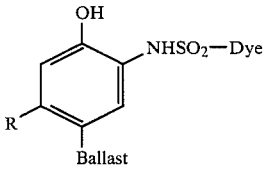

U.S. Pat. No. 4,055,428

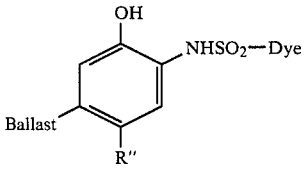

U.S. Pat. No. 4,336,322

-continued

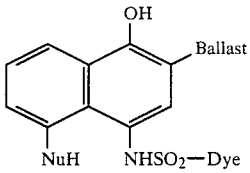

Japanese Patent Application (OPI) No. 65839/84

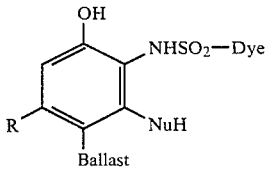

Japanese Patent Application (OPI) No. 69839/84

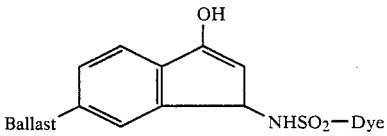

Japanese Patent Application (OPI) No. 3819/78

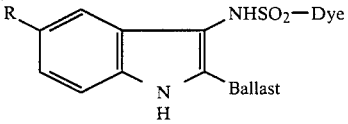

Japanese Patent Application (OPI) No. 104343/76

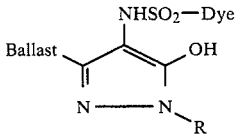

Japanese Patent Application (OPI) No. 104343/76

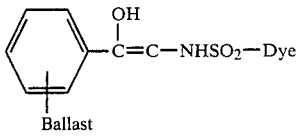

Japanese Patent Application (OPI) No. 104343/76

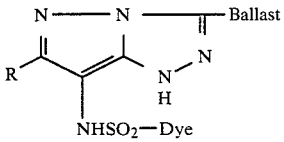

Research Disclosure, No. 17465

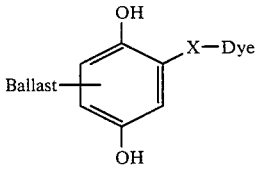

U.S. Pat. No. 3,725,062

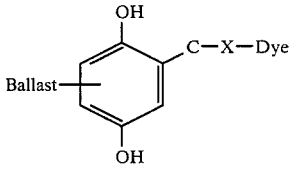

U.S. Pat. No. 3,728,113

-continued

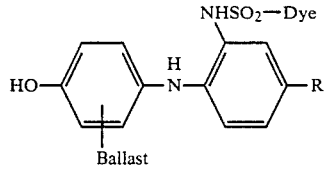

U.S. Pat. No. 3,443,939

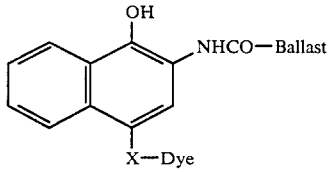

Japanese Patent Application (OPI) No. 116537/83

All the dye providing substances as described above can be used in the present invention.

Representative examples of dye providing substances which can be used in the present invention are compounds described in Japanese Patent Application (OPI) No. 84236/82, pp. 60–91. Of these compounds, Compounds 1 to 3, 10 to 13, 16 to 19, 28 to 30, 33, 35, 38 to 40, and 42 to 64 are preferred. In addition, the following cyan or yellow dye providing substances are useful.

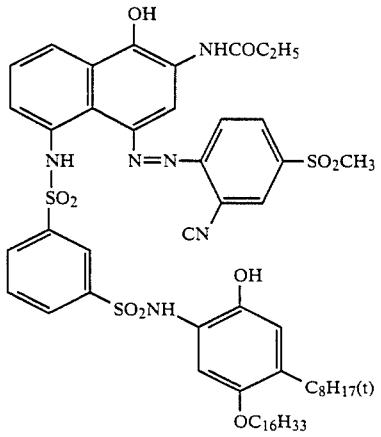

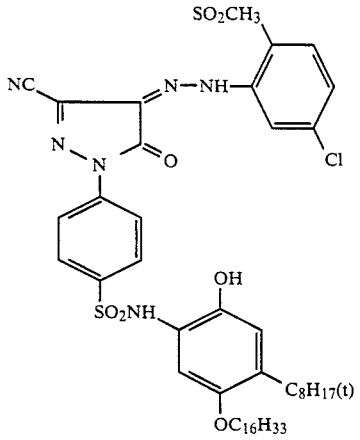

The above compounds are given by way of illustration and the present invention is not limited thereto.

In the present invention, the dye providing substance can be incorporated in a layer of the light-sensitive element by known techniques such as the method described in U.S. Pat. No. 2,322,027. In this case, the following high boiling and low boiling organic solvents can be used.

High boiling organic solvents such as phthalic acid alkyl esters (e.g., dibutyl phthalate and dioctyl phthalate), phosphoric acid esters (e.g., diphenyl phosphate, triphenyl phosphate, tricresyl phosphate, and dioctylbutyl phosphate), citric acid esters (e.g., tributyl acetylcitrate), benzoic acid esters (e.g., octyl benzoate), alkylamides (e.g., diethyllaurylamide), fatty acid esters (e.g., dibutoxyethyl succinate and dioctyl azelate), and trimesic acid ester (e.g., tributyl trimesicate), and orgaic solvents having a boiling pint of about 30° to 160° C., such as lower alkyl acetates (e.g., ethyl acetate and butyl acetate), ethyl propionate, sec-butyl alcohol, methyl isobutyl ketone, $\beta$-ethoxyethyl acetate, methyl cellosolve acetate, and cyclohexanone can be used.

The dye providing substance is dissolved in an organic solvent described above and then dispersed in a hydrophilic colloid.

The above high boiling and low boiling organic solvents may be used in combination with each other.

The dispersion method using polymers as described in Japanese Patent Publication No. 39863/76 and Japanese Patent Application (OPI) No. 59943/76 can also be used. In dispersing the dye providing substance in a hydrophilic colloid, various surface active agents can be used. As surface active agents, those as described hereinafter can be used.

The amount of the high boiling organic solvent used is not more than about 10 g, preferably not more than about 5 g, per gram of the dye providing substance.

In the present invention, it is desirable to add a reducing substance to the light-sensitive element. As such reducing substances, compounds generally known as reducing agents and the above described dye providing substances having reducing properties can be used. In addition, reducing agent precursors which do not have reducing properties by themselves but exhibit reducing properties in the process of development by the action of nucleophilic reagents or heat can be used.

Examples of reducing agents which can be used in the present invention include inorganic reducing agents such as sodium sulfite and sodium hydrogensulfite, benzenesulfinic acids, hydroxylamines, hydrazines, hydrazides, boron/amine complexes, hydroquinones, aminophenols, catechols, p-phenylenediamine, 3-pyrazolidinones, hydroxytetronic acid, ascorbic acid, and 4-amino-5-pyrazolones. In addition, reducing agents as described in T. H. James, *The Theory of the Photographic Process*, pp. 291–334 (4th Ed.) can be used. Reducing agent precursors as described in Japanese Patent Application (OPI) Nos. 138736/81, 40245/82 and U.S. Pat. No. 4,330,617 can be used.

Combinations of various developing agents as described in U.S. Pat. No. 3,039,869 can be used.

The amount of the reducing agent used is about 0.01 to 20 mols, especially preferably about 0.1 to 10 mols, per mol of silver.

In the present invention, an image forming accelerator can be used. The image forming accelerator has various functions such as to accelerate the oxidation reduction reaction between a silver salt oxidizing agent and a reducing agent, to accelerate reactions such as the formation of a dye from a dye providing substance, decomposition of a dye, and release of a mobile dye, ahd to accelerate the transfer of a dye from a layer of the light-sensitive material to a dye fixing layer. From a standpoint of physical and chemical capability, such agents can be divided into bases, nucleophilic compounds, oils, heat solvents, surface active agents, compounds having an interaction between silver and silver ions, and so forth. These substances usually have a number of such functions and generally exhibit more than one of the above acceleration effects.

Representative examples of image forming accelerators divided into several groups according to their functions are shown below. It is to be noted, however, that this classification is for convenience and in many cases one compound possesses a number of functions.

(a) Bases

Preferred examples of inorganic bases include the hydroxides, di- or triphosphates, borates, carbonates, quinoline acid salts, and metaborates of alkali metals or alkaline earth metals; ammonium hydroxide; hydroxides of quaternary alkylammonium; and hydroxides of other metals. Preferred examples of organic bases include aliphatic amines (trialkylamines, hydroxylamines and aliphatic polyamines); aromatic amines (N-alkyl-substituted aromatic amines, N-hydroxyalkyl-substituted aromatic amines, and bis p-(dialkylamino)phenyl methanes), heterocyclic amines, amidines, cyclic amidines, guanidines, and cyclic guanidines. Particularly preferred are those having a pKa of not less than about 8.

(b) Nucleophilic Compounds

Examples include water and water releasing compounds, amine compounds, amidine compounds, guanidine compounds, hydroxylamines, hydrazines, hydrazides, oximes, hydroxamic acids, sulfonamides, active methylene compounds, alcohols, and thiols In addition, the salts or precursors of the above compounds can be used.

(c) Oils

High boiling organic solvents (so-called plasticizers) as used as solvents in dispersing and emulsifying hydrophobic compounds can be used.

(d) Heat Solvents

Compounds which are solid at ambient temperature and melt and act as solvents at temperatures close to developing temperatures; for example, those which are solid at a temperature less than about 40° C. among ureas, urethanes, amides, pyridines, sulfonamides, sulfones, sulfoxides, esters, ketones and ethers can be used.

(e) Surface Active Agents

Typical examples are pyridinium salts described in Japanese Patent Application (OPI) No. 74547/84, ammonium salts, phosphonium salts, and polyalkylene oxides described in Japanese Patent Application (OPI) No. 57231/84.

(f) Compounds Having Interaction between Silver and Silver Ions

Typical examples are imides, nitrogen-containing heterocyclic compounds described in Japanese Patent Application No. 51657/83, and thiols, thioureas and thioethers described in Japanese Patent Application No. 222247/82.

The image forming accelerator may be incorporated in any one or both of the light-sensitive element and the dye fixing element The image forming accelerator may be incorporated in any of an emulsion layer, an interlayer, a protective layer, a dye fixing layer, and layers adjacent thereto, including materials in which a light-sensitive layer and a dye fixing layer are provided on the same support.

The above image forming accelerators can be used alone or in combination with each other. When several types of agents are used in combination, a greater acceleration effect can be obtained.

In the present invention, various development stopping agents can be used in combination with the development inhibitor precursors.

The term "development stopping agent" as used herein means a compound which after appropriate development, rapidly neutralizes or reacts with a base, thereby lowering the concentration of the base in the coating layer to stop development, or a compound which inhibits development through the interaction between silver and silver salts. In particular, acid precursors releasing an acid on heating, electrophilic compounds undergoing a substitution reaction with a base on heating, nitrogen-containing heterocyclic compounds, mercapto compounds, and the like can be listed. Examples of acid precursors include oxime esters as described in Japanese Patent Application Nos. 216928/83 and 48305/84, and compounds releasing an acid by the Lossen rearrangement as described in Japanese Patent Application No. 85834/84 Examples of electrophilic compounds undergoing a substitution reaction with a base on heating are compounds as described in, for example, Japanese Patent Application No. 85836/84.

The mol ratio of base precursor to acid precursor (base precursor/acid precursor) is preferably about 1/20 to 20/1 and more preferably about 1/5 to 5/1.

In the present invention, compounds for activation of development, and at the same time, for stabilization of an image can be used. Preferred examples of such compounds are compounds having 2-carboxycarboxyamide as an acid portion, such as isothiuroniums (e.g., 2-hydroxyethylisothiuronium trichloroacetate) as described in U.S. Pat. No. 3,301,678, bis(isothiuronium) compounds (e.g., 1,8-(3,6-dioxaoctane)-bis(isothiuronium trichloroacetate) as described in U.S. Pat. No. 3,669,670, thiol compounds described in West German Patent (OLS) No. 2,162,714, thiazolium compounds (e.g., 2-amino-2-thiazolium trichloroacetate and 2-amino-5-bromoethyl-2-thiazolium trichloroacetate) as described in U.S. Pat. No. 4,012,260, and bis(2-amino-2-thiazolium)methylenebis(sulfonylacetate), and 2-amino-2-thiazoliumphenylsulfonyl acetate as described in U.S. Pat. No. 4,060,420.

In addition, azole thioethers and blocked azolinthione compounds as described in Belgian Patent 768,071, 4-aryl-1-carbamyl-2-tetrazoline-5-thione compounds as described in U.S. Pat. No. 3,893,859, and compounds as described in U.S. Pat. Nos. 3,839,041, 3,844,788 and 3,877,940 are preferably used.

In the present invention, if necessary, an image toning agent can be incorporated. Useful examples of such image toning agents are 1,2,4-triazole, 1H-tetrazole, thiouracil, and 1,3,4-thiadiazole. Preferred toning agent examples include 5-amino-1,3,4-thiadiazole2-thiol, 3-mercapto-1,2,4-triazole, bis(dimethylcarbamyl) disulfide, 6-methylthiouracil and 1-phenyl-2-tetra-azoline-5-thione. Particularly useful toning agents are compounds capable of forming a black image.

The concentration of the toning agent varies with the type of the heat-developable light-sensitive element, processing conditions, desired image, and other factors. In general, the concentration of the toning agent is about 0.001 to 0.1 mol per mol of silver contained in the light-sensitive material.

Binders which are used in the present invention can be incorporated alone or in combination with each other. Hydrophilic binders can be used. Typical examples of these hydrophilic binders are transparent or translucent hydrophilic binders, including natural substances such as proteins (e.g., gelatin, gelatin derivatives) and polysaccharides (e.g., cellulose derivatives, starch and gum arabic) and synthetic polymeric substances such as water-soluble polyvinyl compounds (e.g., polyvinyl pyrrolidone and polyacrylamide). Other synthetic polymeric substances include vinyl compound dispersions which are used to increase the dimensional stability of the photographic material.

The amount of the binder coated is not more than about 20 g, preferably not more than about 10 g, and more preferably not more than about 7 g, per square meter.

In connection with the ratio of a high boiling organic solvent dispersed in a binder along with a hydrophobic compound (e.g., a dye providing substance) to a binder, the solvent is used in an amount of about 1 ml or less, preferably about 0.5 ml or less, and more preferably 0.3 ml or less, per gram of the binder.

In the light-sensitive element and dye fixing element of the present invention, an inorganic or organic hardening agent may be incorporated in a photographic emulsion layer and other binder layers. For example, chromium salts (chromium alum and chromium acetate), aldehydes (e.g., formaldehyde, glyoxal and glutaraldehyde), N-methylol compounds (e.g., dimethylolurea and methyloldimethylhydantoin), dioxane derivatives (e.g., 2,3-dihydroxydioxane), active vinyl compounds (e.g., 1,3,5-triacryloyl-hexahydro-s-triazine, 1,3-vinylsulfonyl-2-propanol and 1,2-bis(vinylsulfonylacetamido)ethane), active halogen compounds (e.g., 2,4-dichloro-6-hydroxy-s-triazine), and mucohalogenic acids (e.g., mucochloric acid and mucophenoxychloric acid) can be used alone or in combination with each other.

A support capable of standing at a processing temperature is used in the light-sensitive element of the present invention and also in the dye fixing element which is used, if necessary. In general, as the support, glass, paper, metal and similar materials are used. In addition, an acetyl cellulose film, a cellulose ester film, a polyvinyl acetal film, a polystyrene film, a polycarbonate film, a polyethylene terephthalate film, and related films or resinous materials can also be used. A paper support laminated with polymers such as polyethylene ethylene can also be used. Polyesters as described in U.S. Pat. Nos. 3,634,089 and 3,725,070 are preferably used.

When a dye providing substance releasing a mobile dye in an imagewise pattern is used in the present invention, a dye transfer aid can be used for the transfer of dye from the light-sensitive layer to the dye fixing layer.

When the transfer aid is externally applied to the photographic material of the present invention, as the dye transfer aid, water and basic aqueous solutions containing caustic soda, caustic potash, and inorganic alkali metal salts are used. In addition, low boiling solvents such as methanol, N,N-dimethylformamide, acetone, and diisobutyl ketone, and mixtures of such low boiling solvents and water or basic aqueous solutions can be used. The dye transfer aid can be used according to a method in which the image receiving layer is wetted with the transfer aid.

If the transfer aid is incorporated in the light-sensitive element or dye fixing element, it is not necessary to supply the transfer aid externally. The transfer aid may be incorporated in the material in the form of water of crystallization or of microcapsules, or as a precursor releasing a solvent at a high temperature. A more preferred method is to incorporate a hydrophilic heat solvent which is solid at ordinary temperature and melts at an elevated temperature in the light-sensitive element or dye fixing element. A hydrophilic heat solvent may be incorporated in any one or both of the light-sensitive element and the dye fixing element The hydrophilic heat solvent may be incorporated in any of an emulsion layer, an interlayer, protective layer, and a dye fixing layer. It is preferred, however, that the hydrophilic heat solvent be incorporated in the dye fixing layer and/or its adjacent layers.

Examples of such hydrophilic heat solvents include ureas, pyridines, amides, sulfonamides, imides, alcohols, oximes, and other heterocyclic compounds.

When a dye providing substance of the above general formula (LI) is incorporated in the light-sensitive element of the present invention, since the dye providing substance is colored, it is not necessary to further incorporate an anti-irradiation or antihalation substance or various dyestuffs in the light-sensitive element, but in order to improve the sharpness of images, filter dyestuffs, absorbing substances, and the like as described in Japanese Patent Publication No. 3692/73, U.S. Pat. Nos. 3,253,921, 2,527,583 and 2,956,879 can be added. As such dyestuffs, those undergoing decoloration on heating are preferred. For example, dyestuffs as described in U.S. Pat. Nos. 3,769,019, 3,745,009 and 3,615,432 are preferred.

The light-sensitive element which is used in the present invention may contain, if necessary, various conventional additives used in heat-developable light-sensitive materials, such as a plasticizer, a sharpness improving dyestuffs, an AH dyestuff (i.e., antihalation dyestuff), a sensitizing dye, a matting agent, a surface active agent, a brightening agent, and an antifading agent as described in *Research Disclosure,* Vol. 170, June, 1978, No. 17029.

A mordant used in the dye fixing layer in the present invention can be selected appropriately from commonly used mordants. Of these compounds, polymer mordants are particularly preferred. These polymer mordants include polymers containing a tert-amino group, polymers containing a nitrogen-containing heterocyclic portion, and polymers containing these quaternary cationic groups.

Representative examples of polymers containing a vinyl monomer unit having a tert-amino group are described in, for example, Japanese Patent Application Nos. 169012/83 and 166135/83. Representative examples of polymers containing a vinyl monomer unit having a tert-imidazole group are described in Japanese Patent Application Nos. 226497/83, 232071/83, U.S. Pat. Nos. 4,282,305, 4,115,124 and 3,148,061.

Preferred examples of polymers containing a vinyl monomer unit having a quaternary imidazolium salt are described in, for example, British Pat. Nos. 2,056,101, 2,093,041, 1,594,961, U.S. Pat. Nos. 4,124,386, 4,115,124, 4,273,853, 4,450,224 and Japanese Patent Application (OPI) No. 28225/83.

Preferred examples of polymers containing a vinyl monomer unit having a quaternary ammonium salt are described in, for example, U.S. Pat. Nos. 3,709,690, 3,898,088, 3,958,995, Japanese Patent Application Nos. 166135/83, 169012/83, 232070/83, 232072/83 and 91620/84.

As a light source for imagewise exposure of the heat-developable light-sensitive material, radiation including visible light can be used. In general, light sources commonly used for color printing, such as a tungsten lamp, a mercury lamp, a halogen lamp (e.g., an iodine lamp), a xenon lamp, a laser light source, a CRT light source, a fluorescent tube, a light emitting diode (LED) and the like can be employed.

The heating temperature for heat development is from about 80° to 250° C. A useful heating temperature is between about 110° and 180° C. Within this temperature range, temperatures of at least 140° C. are preferred, and temperatures of at least 150° C. are particularly preferred. The transfer process can be carried out within a temperature range between approximately the heating temperature for heat development and room temperature. A temperature range between about the heating temperature for heat development and a temperature about 10° C. lower than the heating temperature for heat development is more preferred. As a heating means for heat development and transfer, a hot plate, an iron, a heat roller, and heat generators using carbon or titanium white, for example, can be used.

The dye transfer aid (e.g., water) can be introduced between a light-sensitive layer of the heat-developable light-sensitive element and a dye fixing layer of the dye fixing material to accelerate the transfer of images. It is also possible to apply the dye transfer aid to any one or both of the light-sensitive layer and the dye fixing layer, and then to superpose the light-sensitive layer and the dye fixing layer.

The dye transfer aid can be added to the light-sensitive layer or dye fixing layer by techniques such as the roller coating method or wire bar coating method described in Japanese Patent Application (OPI) No. 55907/83, the method of coating water on the dye fixing material using a water absorbing material as described in Japanese Patent Application No. 55908/73, the method of adding the dye transfer aid by forming beads between the heat-developable light-sensitive element and the dye fixing element as described in Japanese Patent Application No. 55906/83, the method of adding the dye transfer aid by forming beads between a water repellent roller and the dye fixing layer as described in Japanese Patent Application No. 55910/83, the dipping method, the extrusion method, the method of adding the dye transfer aid by jetting it through small holes, and the method of adding the dye transfer aid by rupturing a pod containing the agent.

The dye transfer aid may be supplied in a predetermined amount as described in Japanese Patent Application No. 37902/83, or may be supplied in a sufficient amount, and then squeezed off by applying pressure using a roller, for example, and dried by heating to thereby control the amount thereof.

One typical method is to apply the dye transfer aid to the dye fixing element by the above described method, pass the dye fixing element through rollers under pressure to remove an excess of the dye transfer aid, and then superpose the dye fixing element on the heat-developable light-sensitive material.

In the transfer step, heating can be carried out by various techniques such as heating by passing between hot plates, heating by bringing the element into contact with a hot plate (see, for example, Japanese Patent Application (OPI) No. 62635/75), heating by bringing the element into contact with a rotary hot drum or hot roll (see, for example, Japanese Patent Publication No. 10791/78), heating by passing the element through a hot air (see, for example, Japanese Patent Application (OPI) No. 32737/78), heating by passing the element through an inert liquid maintained at a given temperature, and heating by moving the element along a heat source by means of a roller, a belt or a guide member (see, for example, Japanese Patent Publication No. 2546/69). In addition, a method can be employed in which the dye fixing material is provided with a layer of an electrically conductive material such as graphite, carbon black and metal and is directly heated by passing an electric current through the electrically conductive layer.

In the above transfer step, the dye transfer can be attained by heating at a temperature ranging from the heat development temperature to room temperature. It is particularly preferred that the element be heated at a temperature not less than about 60° C. and at least about 10° C. lower than the temperature at the heat development step.

The pressure under which the heat-developable light-sensitive material and the dye fixing element are brought into close contact with each other varies depending on a method of superposing the elements and the type of each element. In general, the pressure is from about 0.1 to 100 kg/cm$^2$ and preferably from about 1 to 50 kg/cm$^2$ (as described in, for example, Japanese Patent Application No. 55691/83).

The heat-developable light-sensitive material and the dye fixing element can be pressed by techniques such as by passing the elements between a pair of rollers, or by pressing the elements on a plate having high smoothness. The roller or plate, when pressure is applied, may be heated at a temperature ranging from room temperature to the temperature at the heat development step.

The present invention is described below in greater detail with reference to the following examples, but the present invention is not to be construed as being limited thereto.

EXAMPLE 1

Preparation of Silver Iodobromide Emulsion

A mixture of 40 g of gelatin and 26 g of KBr was dissolved in 3,000 ml of water, and the resulting solution was stirred while maintaining it at 50° C.

A solution of 34 g of silver nitrate which was dissolved in 200 ml of water was added to the above solution over 10 minutes.

Then a solution of 3.3 g of KI in 100 ml of water was added to the solution over 2 minutes.

The silver iodobromide emulsion thus obtained was precipitated to remove an excess of salts. Then, the emulsion was adjusted to pH 6.0 to yield 400 g of a silver iodobromide emulsion.

Preparation of Silver Benzotriazole Emulsion

A mixture of 28 g of gelatin and 13.2 g of benzotriazole was dissolved in 3,000 ml of water, and the resulting solution was stirred while maintaining it at 40° C. A solution of 17 g of silver nitrate in 100 ml of water was added to the above solution over 2 minutes.

This silver benzotriazole emulsion was precipitated to remove an excess of salts. Then, it was adjusted to pH 6.0 to yield 400 g of a silver benzotriazole emulsion.

Preparation of Dispersion of Dye Providing Substance (same as the above described image forming substance, hereinafter the same) in Gelatin A mixture of 5 g of Dye Providing Substance (1) shown below, 0.5 g of sodium 2-ethylhexylsuccinate sulfonate, and 5 g of tricresyl phosphate (TCP) was dissolved in 30 ml of ethyl acetate by heating at about 60° C. The solution thus prepared and 100 g of a 10 wt % solution of gelatin were mixed and stirred, and then the solution was dispersed for 10 minutes at 10,000 rpm by the use of a homogenizer to provide a "dispersion portion of the dye providing substance".

Dye Providing Substance (1)

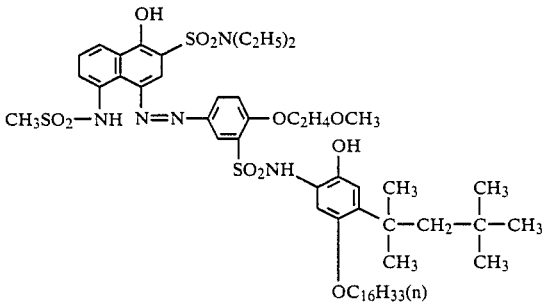

Preparation of Gelatine Dispersion of Compound of the Present Invention

Compound (37) of the present invention (3 g) was added to 100 g of a 1 wt % aqueous gelatin solution and ground for 10 minutes in a mill using 100 g of glass beads having an average particle size of about 0.6 mm. The glass beads were separated by filtration to obtain a gelatin dispersion of the compound of the present invention.

Preparation of Light-Sensitive Elements A and B

| Light-Sensitive Element A | | |
|---|---|---|
| (a) | Silver iodobromide emulsion | 20 g |
| (b) | Silver benzotriazole emulsion | 10 g |
| (c) | Dispersion of Dye Providing Substance (1) | 33 g |
| (d) | 5 wt % aqueous solution of a compound having the following formula: | 10 ml |

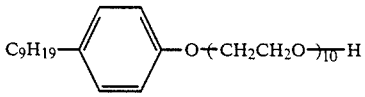

| | | |
|---|---|---|
| (e) | 10 wt % aqueous solution of a compound having the following formula: $H_2NSO_2N(CH_3)_2$ | 4 ml |
| (f) | Solution of 1.6 g of guanidine trichloroacetate (base precursor) in 16 ml of ethanol | |
| (g) | Gelatin dispersion of Compound (37) (development inhibitor precursor) of the present invention | 3 ml |
| (h) | Water | 7 ml |

The above ingredients were mixed, dissolved by heating, coated on a 180 μm thick polyethylene terephthalate film in a wet coating thickness of 33 μm, and then dried. Moreover, as a protective layer, the following composition was coated thereon.

| | | |
|---|---|---|
| (1) | 10 wt % aqueous gelatin solution | 30 ml |
| (2) | Water | 70 ml |

The above ingredients were mixed, coated in a wet coating thickness of 30 μm, and dried to prepare Light-Sensitive Element A.

| Light-Sensitive Element B | | |
|---|---|---|
| (a) | Silver iodobromide emulsion | 20 g |
| (b) | Silver benzotriazole emulsion | 10 g |
| (c) | Dispersion of Dye Providing Substance (1) shown above | 33 g |
| (d) | 5 wt % aqueous solution of a compound having the following formula: | 10 ml |

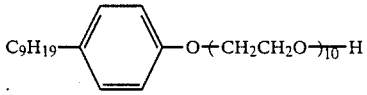

| | | |
|---|---|---|
| (e) | 10 wt % aqueous solution of a compound having the following formula: $H_2NSO_2N(CH_3)_2$ | 4 ml |
| (f) | Solution of 1.6 g of guanidine trichloroacetate (base precursor) in 16 ml of ethanol | |
| (g) | Water | 10 ml |

The above ingredients were mixed, dissolved by heating, and then coated on a 180 μm thick polyethylene terephthalate film in a wet coating thickness of 33 μm. A protective layer was provided in the same manner as in the preparation of Light-Sensitive Element A.

Preparation of Dye Fixing Element Having Image Receiving Layer

Initially 0.75 g of Gelatin Hardening Agent H-1 shown below, 0.25 g of Gelatin Hardening Agent H-2 shown below, 160 ml of water, and 100 g of 10 wt % lime-processed gelatin were uniformly mixed. The mixture thus obtained was uniformly coated on a paper support laminated with a polyethylene containing titanium oxide dispersed therein in a wet coating thickness of 60 μm and then dried.

Gelatin Hardening Agent H-1

$CH_2{=}CHSO_2CH_2CONHCH_2.SO_2CH{=}CH_2$

Gelatin Hardening Agent H-2

$CH_2{=}CHSO_2CH_2CONHCH_2.CH_2CH_2NHCOCH_2SO_2CH{=}CH_2$

Then, 15 g of a polymer mordant having the structure shown below was dissolved in 200 ml of water and then uniformly mixed with 100 g of 10 wt % lime-processed gelatin. The resulting mixture was uniformly coated on the above prepared coating in a wet coating thickness of 85 μm, and then dried to prepare the desired dye fixing element.

Polymer Mordant

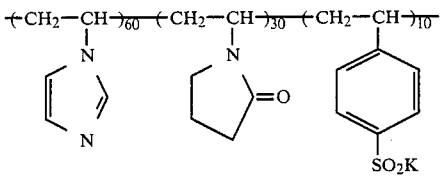

Light-Sensitive Elements A and B were each exposed imagewise at 2,000 lux for 10 seconds using a tungsten lamp and then uniformly heated for 30 seconds on a heat block maintained at 140° or 143° C.

The dye fixing element was dipped in water. Then, the heated Light-Sensitive Elements A and B were each superposed on the dye fixing element such that the coatings of the elements were in contact with each other.

The light-sensitive and dye fixing elements were heated for 6 seconds on a heat block maintained at 80° C. and then the dye fixing element was peeled apart from the light-sensitive element whereupon a negative magenta dye was formed on the dye fixing element. This negative image was measured for density by the use of a Macbeth reflection densitometer (RD-519). The results are shown in Table 1.

TABLE 1

| Sample | Heating at 140° C. for 30 Seconds Minimum Density | Heating at 143° C. for 30 Seconds Minimum Density |
|---|---|---|
| A (Invention) | 0.16 | 0.18 |
| B (Comparison) | 0.15 | 0.28 |

It can be seen from the above results (TABLE 1) that if the development inhibitor precursor of the present invention is used, an increase in the minimum density can be reduced even if the developing temperature is increased by 3° C. On the other hand, in the comparative example, the formation of fog is seriously increased. Accordingly, it can be seen that the photographic element of the present invention has a high temperature compensation effect.

EXAMPLE 2

Elements C to G were prepared in the same manner as in Example 1 except that the compounds shown in Table 2 were each used in place of Compound (37) of the present invention. The results are shown in Table 2.

TABLE 2

| Sample | Compound No. | Heating at 140° C. for 30 Seconds Maximum Density | Heating at 140° C. for 30 Seconds Minimum Density | Heating at 143° C. for 30 Seconds Maximum Density | Heating at 143° C. for 30 Seconds Minimum Density |
|---|---|---|---|---|---|
| C | (4) | 2.06 | 0.17 | 2.13 | 0.19 |
| D | (21) | 1.98 | 0.14 | 2.04 | 0.16 |
| E | (20) | 2.07 | 0.15 | 2.11 | 0.19 |
| F | (18) | 2.04 | 0.17 | 2.09 | 0.20 |
| G | (39) | 2.10 | 0.18 | 2.14 | 0.20 |

It can be seen from the above results (TABLE 2) that the photographic element of the present invention has an excellent temperature compensation effect.

EXAMPLE 3

A multilayer color photographic element was prepared as follows.

Light-Sensitive Element H

A mixture of 5 g of Yellow Dye Providing Substance (2), 0.5 g of sodium 2-ethylhexylsuccinate sulfonate as a surface active agent, and 10 g of triisononyl phosphate was dissolved in 30 ml of ethyl acetate by heating at about 60° C. to prepare a uniform solution. This solution was mixed with 100 g of a 10 wt % solution of lime-processed gelatin, and then dispersed therein at 10,000 rpm for 10 minutes using a homogenizer, to obtain a "dispersion of the yellow dye providing substance".

A dispersion of a magenta dye providing substance was prepared in the same manner as above except that Magenta Dye Providing Substance (1) used in Example 1 was used. Also, a dispersion of Cyan Dye Providing Substance (3) shown below was prepared in the same manner as above.

Using these dispersions, a multilayer color light-sensitive element having the structure shown below was produced.

Dye Providing Substance (2)

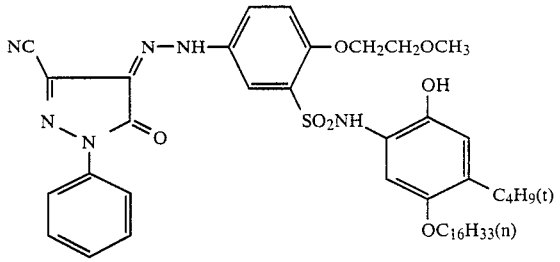

Dye Providing Substance (3)

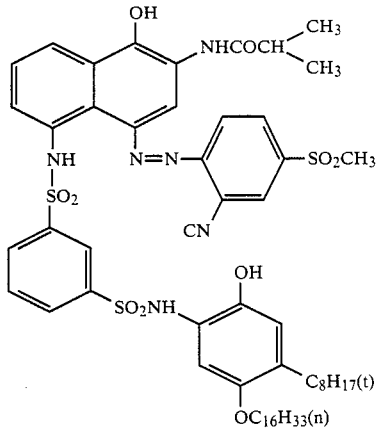

| Light-Sensitive Element H | Amount |
|---|---|
| Sixth Layer: | |
| Gelatin | 1,000 mg/m$^2$ |
| Guanidine trichloroacetate | 190 mg/m$^2$ |
| Gelatin dispersion of Compound (15) (development inhibitor precursor) of the present invention | 10 mg/m$^2$ |
| Fifth Layer: Blue-Sensitive Emulsion Layer | |
| Silver iodobromide emulsion*3 (iodine: 10 mol %, calculated as | 400 mg/m$^2$ |

-continued

| Light-Sensitive Element H | Amount |
|---|---|
| silver) | |
| Dimethyl sulfide | 180 mg/m$^2$ |
| Guanidine trichloroacetate | 440 mg/m$^2$ |
| Gelatin dispersion of Compound (37) (development inhibitor precursor) of the present invention | 5 mg/m$^2$ |
| Dispersion of Yellow Dye Providing Substance (2) | 400 mg/m$^2$ |
| Gelatin | 1,000 mg/m$^2$ |
| High boiling solvent*1 | 800 mg/m$^2$ |
| Surface active agent*2 | 100 mg/m$^2$ |
| Fourth Layer: Interlayer | |
| Gelatin | 1,200 mg/m$^2$ |
| Guanidine trichloroacetate | 190 mg/m$^2$ |
| Gelatin dispersion of Compound (15) (development inhibitor precursor) of the present invention | 10 mg/m$^2$ |
| Third Layer: Green-Sensitive Emulsion Layer | |
| Silver iodobromide emulsion*3 (iodine: 10 mol %, calculated as silver) | 400 mg/m$^2$ |
| Dimethyl sulfamide | 180 mg/m$^2$ |
| Sensitizing Dye (D-1) | $10^{-6}$ mol/m$^2$ |
| Guanidine trichloroacetate | 440 mg/m$^2$ |
| Gelatin dispersion of Compound (37) (development inhibitor precursor) of the present invention | 5 mg/m$^2$ |
| Dispersion of Magenta Dye Providing Substance (1) | 400 mg/m$^2$ |
| Gelatin | 1,000 mg/m$^2$ |
| High boiling solvent*1 | 800 mg/m$^2$ |
| Surface active agent*2 | 100 mg/m$^2$ |
| Second Layer: Interlayer | |
| Gelatin | 1,000 mg/m$^2$ |
| Guanidine trichloroacetate | 198 mg/m$^2$ |
| Gelatin dispersion of Compound (15) (development inhibitor precursor) of the present invention | 10 mg/m$^2$ |
| First Layer: Red-Sensitive Emulsion Layer | |
| Silver iodobromide emulsion*3 (iodine: 10 mol %, calculated as silver) | 400 mg/m$^2$ |
| Benzenesulfonamide | 180 mg/m$^2$ |
| Sensitizing Dye (D-2) | $8 \times 10^{-7}$ mol/m$^2$ |
| Guanidine trichloroacetate | 440 mg/m$^2$ |
| Gelatin dispersion of Compound (37) (development inhibitor precursor) of the present invention | 5 mg/m$^2$ |
| Dispersion of Cyan Dye Providing Substance (3) | 300 mg/m$^2$ |
| Gelatin | 1,000 mg/m$^2$ |

-continued

| Light-Sensitive Element H | Amount |
|---|---|
| High boiling solvent*1 | 600 mg/m$^2$ |
| Surface active agent*2 | 100 mg/m$^2$ |
| Support | |

Note:

*1$(iso\text{-}C_9H_{19}O)_3P{=}O$

*2 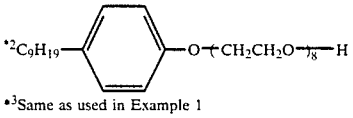

*3Same as used in Example 1

Sensitizing Dye (D-1)

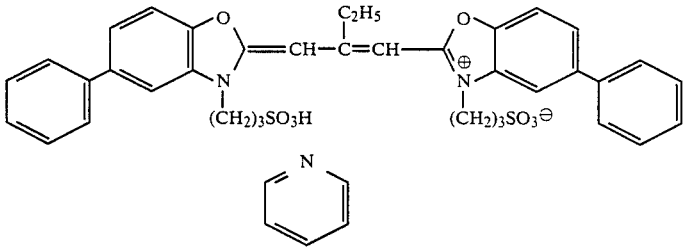

Sensitizing Dye (D-2)

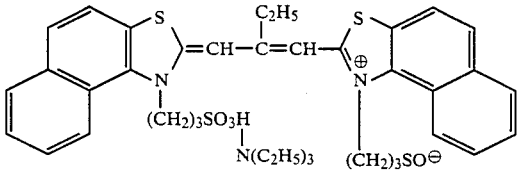

The above multilayer color light-sensitive element was exposed through Blue, Green and Red three color separation filters continuously changing in density at 2,000 lux for 10 seconds using a tungsten lamp.

Thereafter the element was processed in the same manner as in Example 1. The results are shown in Table 3.

TABLE 3

| Three Color Separation Filter | Light-Sensitive Element H: Heating at 140° C. for 30 Seconds, Maximum Density | Heating at 140° C. for 30 Seconds, Minimum Density | Heating at 143° C. for 30 Seconds, Maximum Density | Heating at 143° C. for 30 Seconds, Minimum Density |
|---|---|---|---|---|
| B | 1.84 | 0.21 | 1.90 | 0.25 |
| G | 2.04 | 0.18 | 2.08 | 0.24 |
| R | 2.12 | 0.17 | 2.20 | 0.20 |

It can be seen from the above results TABLE 3) that the photographic element of the present invention has a high temperature compensation effect.

EXAMPLE 4

Preparation of Silver Halide Emulsion for Fifth Layer

To an aqueous gelatin solution (prepared by dissolving 20 g of gelatin and ammonia in 1,000 ml of water and maintained at 50° C.) which had been well stirred were simultaneously added 1,000 ml of an aqueous solution containing potassium iodide and potassium bromide and an aqueous silver nitrate solution (prepared by dissolving 1 mol of silver nitrate in 1,000 ml of water). In this way, a single dispersion silver iodobromide octahedral emulsion (iodine: 5 mol %) having an average particle size of 0.5 μm was prepared.

After washing with water and desalting, 5 mg of chloroauric acid (4 hydrate) and 2 mg of sodium thiosulfate were added, and the emulsion was subjected to gold sensitization and sulfur sensitization at 60° C. The yield of the emulsion was 1.0 kg.

Preparation of Emulsion for Third Layer

To an aqueous gelatin solution (prepared by dissolving 20 g of gelatin and 3 g of sodium chloride in 1,000 ml of water and maintained at 75° C.) which had been well stirred were added 600 ml of an aqueous solution containing sodium chloride and potassium bromide, an aqueous silver nitrate solution (prepared by dissolving 0.59 mol of silver nitrate in 600 ml of water), and Dye (I) solution as described hereinafter all at the same time at an equal flow rate over 40 minutes. In this manner, a single dispersion cubic silver chlorobromide emulsion (bromine: 80 mol %) having an average particle size of 0.35 μm, with the dye adsorbed thereon was prepared.

After washing with water and desalting, 5 mg of sodium thiosulfate and 20 mg of 4-hydroxy-6-methyl1,3,3a,7-tetraazaindene were added, and chemical sensitization was conducted at 60° C. The yield of the emulsion was 600 g.

| Dye (I) Solution | |
|---|---|
| Dye: | 160 mg |

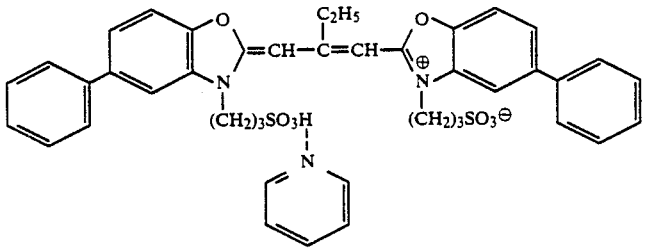

| | |
|---|---|
| Methanol | 400 ml |

Preparation of Emulsion for First Layer

To an aqueous gelatin solution (prepared by dissolving 20 g of gelatin and 3 g of sodium chloride in 1,000 ml of water and maintained at 75° C.) which had been well stirred were added at the same time 600 ml of an aqueous solution containing sodium chloride and potassium bromide and an aqueous silver nitrate solution (prepared by dissolving 0.59 mol of silver nitrate in 600 ml of water) over 40 minutes at an equal flow rate. In this manner, a single dispersion cubic silver chlorobromide emulsion (bromine: 80 mol %) having an average particle size of 0.35 μm was prepared.

After washing with water and desalting, 5 mg of sodium thiosulfate and 20 mg of 4-hydroxy-6-methyl1,3,3a,7-tetraazaindene were added and chemical sensitization was conducted at 60° C.. The yield of the emulsion was 600 g.

The silver benzotriazole emulsion was prepared in the same manner as in Example 1.

Light-Sensitive Element I

| | Amount |
|---|---|
| Sixth Layer: | |
| Gelatin | 740 mg/m$^2$ |
| Base Precursor (A)*3 | 160 mg/m$^2$ |
| Fifth Layer: | |
| Blue-Sensitive Emulsion Layer | |
| Silver iodobromide emulsion (iodine: 5 mol %, calculated as silver) | 500 mg/m$^2$ |
| Dimethylsulfamide | 160 mg/m$^2$ |
| Base Precursor (A)*3 | 180 mg/m$^2$ |
| Silver benzotriazole emulsion (calculated as silver) | 300 mg/m$^2$ |
| Dispersion of Yellow Dye Providing Substance (2) | 400 mg/m$^2$ |
| Gelatin | 1,200 mg/m$^2$ |
| High boiling solvent*1 | 700 mg/m$^2$ |
| Surface active agent*2 | 70 mg/m$^2$ |
| Fourth Layer: | |
| Interlayer | |
| Gelatin | 700 mg/m$^2$ |
| Base Precursor (A)*3 | 150 mg/m$^2$ |
| Third Layer: | |
| Green-Sensitive Emulsion Layer | |
| Silver chlorobromide emulsion (bromine: 80 mol %, calculated as silver) | 200 mg/m$^2$ |
| Dimethylsulfamide | 140 mg/m$^2$ |
| Silver benzotriazole emulsion (calculated as silver) | 100 mg/m$^2$ |
| Base Precursor (A)*3 | 140 mg/m$^2$ |
| Dispersion of Magenta Dye Providing Substance (1) | 330 mg/m$^2$ |
| Gelatin | 860 mg/m$^2$ |
| High boiling solvent*1 | 430 mg/m$^2$ |
| Surface active agent*2 | 60 mg/m$^2$ |
| Second Layer: | |
| Interlayer | |
| Gelatin | 1,000 mg/m$^2$ |
| Base Precursor (A)*3 | 160 mg/m$^2$ |
| First Layer: | |
| Red-Sensitive Emulsion Layer | |
| Silver chlorobromide emulsion (bromine: 80 mol %, calculated as silver) | 200 mg/m$^2$ |
| Benzenesulfonamide | 140 mg/m$^2$ |
| Sensitizing dye*4 | $8 \times 10^{-7}$ mol/m$^2$ |
| Silver benzotriazole emulsion | 230 mg/m$^2$ |
| Base Precursor (A)*3 | 150 mg/m$^2$ |
| Dispersion of Cyan Dye Providing Substance (3) | 300 mg/m$^2$ |
| Gelatin | 850 mg/m$^2$ |
| High boiling solvent*1 | 540 mg/m$^2$ |
| Surface active agent*2 | 60 mg/m$^2$ |

-continued

| | Amount |
|---|---|
| Support | |

Note:
*1 $(iso\text{-}C_9H_{19}O)_3P{=}O$

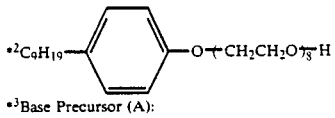

*3 Base Precursor (A):

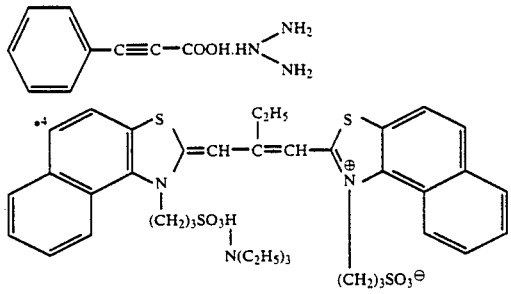

Preparation of Dye Fixing Element

Lime-processed gelatin (12 g) was dissolved in 200 ml of water, and then 16 ml of a 0.5M aqueous solution of zinc acetate was added and uniformly mixed. The mixture thus prepared was uniformly coated on a 100 μm thick white film support of polyethylene terephthalate containing titanium dioxide in a wet coating thickness of 85 μm. Then, the following coating solution was coated thereon in a wet coating thickness of 90 μm and then dried to prepare a dye fixing element.

| Composition of Coating Solution for Dye Fixing Layer (J) | |
|---|---|
| 10 wt % aqueous solution of polyvinyl alcohol (degree of polymerization: 2,000) | 120 g |
| Urea | 20 g |
| N—Methylurea | 20 g |
| 12 wt % aqueous solution of: | 80 g |
| 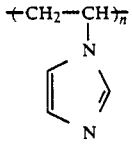 | |
| Gelatin dispersion of Compound (4) (development inhibitor precursor) of the present invention (same as described in Example 2) | 60 ml |

| Composition of Coating Solution for Dye Fixing Layer (K) | |
|---|---|
| 10 wt % aqueous solution of polyvinyl alcohol (degree of polymerization: 2,000) | 120 g |
| Urea | 20 g |
| N—Methylurea | 20 g |
| 12 wt % aqueous solution of: | 80 g |
| 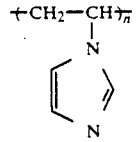 | |
| Water | 60 ml |

The above multilayer color light-sensitive element was exposed through B, G and R three color separation filters continuously changing in density at 2,000 lux for passed through a heat roll maintained at 130° C. under pressure and then immediately heated on a heat block at 120° C. for 30 seconds. Immediately after heating, the dye fixing element was peeled apart from the light-sensitive element whereupon yellow, magenta and cyan dye images were formed on the dye fixing element according to the B, G and R three color separation filters. Each color was measured for the maximum and minimum densities by the use of a Macbeth reflection densitometer (RD-519). The results are shown in Table 4.

TABLE 4

| Light-Sensitive Element I | | | | |
|---|---|---|---|---|
| | Dye Fixing Layer (J) (Example of the Invention) | | Dye Fixing Layer (K) (Comparative Example) | |
| Color Separation Filter | Maximum Density | Minimum Density | Maximum Density | Minimum Density |
| B | 1.78 | 0.17 | 1.82 | 0.26 |
| G | 2.03 | 0.20 | 2.08 | 0.31 |
| R | 2.10 | 0.16 | 2.15 | 0.25 |

It can be seen from the above results (TABLE 4) that when the development inhibitor precursor of the present invention is added to the dye fixing layer, the increase in fog during the transfer process can be controlled.

EXAMPLE 5

A mixture of 10 g of Dye Providing Substance (4) shown below, 0.5 g of sodium 2-ethylhexylsuccinate sulfonate, and 10 g of tricresyl phosphate was dissolved in 20 ml of cyclohexanone by heating at 60° C. to prepare a uniform solution. This solution was mixed with 100 g of a 10 wt % aqueous solution of lime-processed gelatin and then dispersed therein by the use of a homogenizer.

| Preparation of Light-Sensitive Material L | | |
|---|---|---|
| (a) | Silver iodobromide emulsion (same as used in Example 1) | 5.5 g |
| (b) | 10 wt % aqueous gelatin solution | 0.5 g |
| (c) | Dispersion of the above dye providing substance | 2.5 g |
| (d) | 10 wt % ethanol solution of guanidine trichloroacetate | 1 ml |
| (e) | 10 vol % methanol solution of 2,6-dichloro-4-aminophenol | 0.5 ml |
| (f) | 5 wt % aqueous solution of a compound having the following formula: 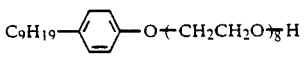 | 1 ml |
| (g) | Gelatin dispersion of Compound (37) (development inhibitor precursor) of the present invention | 0.5 ml |

-continued

| Preparation of Light-Sensitive Material L | | |
|---|---|---|
| (h) | Water | 6 ml |

Dye Providing Substance (4)

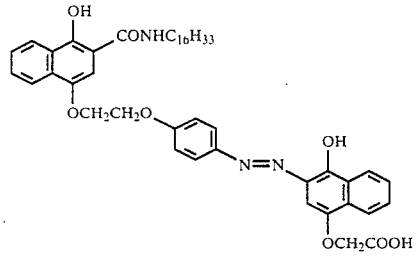

The above ingredients were mixed and dissolved by heating, and then coated on a polyethylene terephthalate film in a wet coating thickness of 85 μm. On the coating thus formed, as a protective layer, gelatin was coated in an amount of 1.5 g/m$^2$ to prepare Light-Sensitive Element L. And the same dye fixing element as in Example 1 was used as a dye fixing element.

Light-Sensitive Element L was exposed and processed in the same manner as in Example 1, and the formed image was measured for the maximum and minimum densities. The results are shown in Table 5.

TABLE 5

| | Heating at 140° C. for 30 Seconds | | Heating at 143° C. for 30 Seconds | |
|---|---|---|---|---|
| Sample | Maximum Density | Minimum Density | Maximum Density | Minimum Density |
| L | 1.74 | 0.12 | 1.83 | 0.20 |

It can be seen from the above results (TABLE 5) that in a light-sensitive element containing a dye providing substance releasing a dye through its coupling reaction with an oxidized product of a developing agent, the effect of the compound of the present invention is marked.

EXAMPLE 6

A dispersion of a reducible dye providing substance was prepared in the same manner as in Example 5 except that a mixture of 5 g of Dye Providing Substance (5) having the formula shown below, 4 g of electron doner shown below, 0.5 g of sodium 2-ethylhexylsuccinate sulfonate, and 10 g of tricresyl phosphate was dissolved in 20 ml of cyclohexanone by heating at about 60° C.

Dye Providing Substance (5)

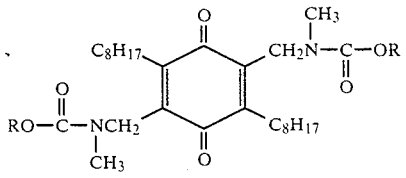

wherein R is:

-continued

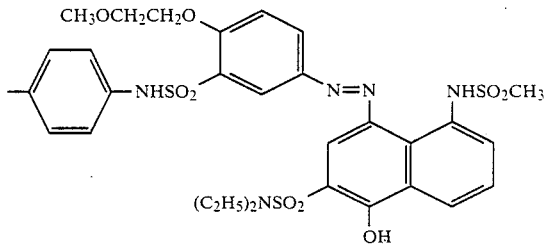

Electron Donor

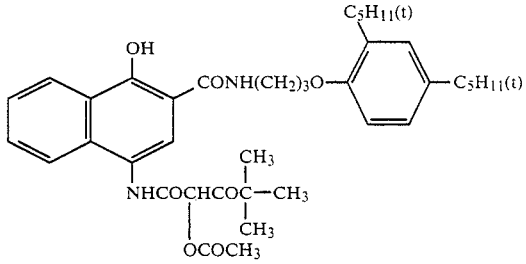

Light-Sensitive Element M was prepared in the same manner as in the preparation of Light-Sensitive Element L of Example 5 except that a dispersion of the above reducible dye providing substance was used in place of the dispersion of Dye Providing Substance (4). And the same dye fixing element as in Example 1 was used as a dye fixing element.

This Light-Sensitive Element M was exposed and processed in the same manner as in Example 1, and the positive image formed was measured for the maximum and minimum densities. The results are shown in Table 6.

TABLE 6

| | Heating at 140° C. for 30 Seconds | | Heating at 143° C. for 30 Seconds | |
|---|---|---|---|---|
| Sample | Maximum Density | Minimum Density | Maximum Density | Minimum Density |
| M | 1.68 | 0.17 | 1.74 | 0.22 |

It can be seen from the above results (TABLE 6) that even in a light-sensitive element containing the above reducible dye providing substance capable of forming a positive image corresponding to a reversed latent silver image, the compound of the present invention is effective.

EXAMPLE 7

Preparation of Gelatin Dispersion of Coupler

A mixture of 5 g of 2-dodecylcarbamoyl-1-naphthol, 0.5 g of sodium 2-ethylhexylsuccinate sulfonate, and 2.5 g of tricresyl phosphate (TCP) was dissolved in 30 ml of ethyl acetate. The resulting solution was mixed with 100 g of a 10 wt % solution of gelatin and then dispersed therein at 10,000 rpm for 10 minutes by the use of a homogenizer.

| Preparation of Light-Sensitive Element N | | |
|---|---|---|
| (a) | Silver iodobromide emulsion (same as used in Example 1) | 10 g |
| (b) | Gelatin dispersion of coupler | 3.5 g |
| (c) | Solution of 0.25 g of guanidine trichloroacetate in 2.5 ml of | |

-continued

| Preparation of Light-Sensitive Element N | | |
|---|---|---|
| | ethanol | |
| (d) | Gelatin (10 wt % aqueous solution) | 5 g |
| (e) | Solution of 2,6-dichloro-p-aminophenol in 15 ml of water | 0.2 g |
| (f) | Gelatin dispersion of Compound (37) (development inhibitor precursor) of the present invention (same as used in Example 1) | 1 ml |

The above ingredients were mixed and then coated on a polyethylene terephthalate support in a wet coating thickness of 60 μm and then dried to prepare Light-Sensitive Element N. And the same dye fixing element as in Example 1 was used as a dye fixing element.

This Light-Sensitive Element N was exposed imagewise at 2,000 lux for 5 seconds by the use of a lamp. Then, Element N was uniformly heated on a heat block maintained at 150° C. or 153° C. for 20 seconds, whereupon a negative cyan image was formed. The image was measured for the density by the use of a Macbeth transmission densitometer (TD-504). The results are shown in Table 7.

TABLE 7

| | Heating at 150° C. for 20 Seconds | | Heating at 153° C. for 20 Seconds | |
|---|---|---|---|---|
| Sample | Maximum Density | Minimum Density | Maximum Density | Minimum Density |
| N | 2.01 | 0.20 | 2.08 | 0.29 |

It can be seen from the above results (TABLE 7) that the photographic element of the present invention has a high temperature compensation effect.

EXAMPLE 8

A black-and-white material is described in example.

| Preparation of Light-Sensitive Element O | | |
|---|---|---|
| (a) | Silver iodobromide emulsion (same as used in Example 1) | 1 g |
| (b) | Silver benzotriazole emulsion (same as used in Example 1) | 10 g |
| (c) | 10 vol % ethanol solution of guanidine trichloroacetate | 1 ml |
| (d) | 5 vol % methanol solution of a compound having the following formula: 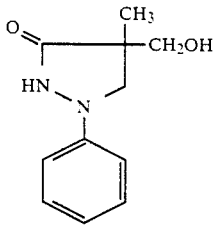 | 2 ml |
| (e) | Gelatin dispersion of Compound (37) (development inhibitor precursor) of the present invention (same as used in Example 1) | 1 ml |

The above ingredients were mixed to prepare a coating solution, and this coating solution was coated on a polyethylene terephthalate support in a wet coating thickness of 60 μm and then dried.

The light-sensitive element thus obtained was exposed imagewise at 2,000 lux for 5 seconds by the use of a tungsten lamp. Then, the element was uniformly heated on a heat block maintained at 130° C. or 133° C. for seconds, whereupon a negative brown image was obtained. The image was measured for the density by the use of a Macbeth transmission densitometer (TD-504). The results are shown in Table 8.

TABLE 8

| | Heating at 130° C. for 30 Seconds | | Heating at 133° C. for 30 Seconds | |
|---|---|---|---|---|
| Sample | Maximum Density | Minimum Density | Maximum Density | Minimum Density |
| O | 0.78 | 0.18 | 0.80 | 0.21 |

It can be seen from the above results (TABLE 8) that the photographic element of the present invention has a high temperature compensation effect.

While the invention has been described in detail and with reference to specific embodiments thereof, it will be apparent to one skilled in the art that various changes and modifications can be made therein without departing from the spirit and scope thereof.

What is claimed is:

1. A heat-developable photographic element comprising a support having thereon (a) a light-sensitive layer comprising a light-sensitive silver halide and a binder, (b) a dye fixing layer fixing a released and then diffused mobile dye comprising a mordant, and (c) a dye providing substance releasing a mobile dye on heat-development, a base precursor and a photographic reagent capable of releasing a compound represented by the general formula (I) by reaction with a base:

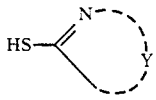

(I)

wherein Y is an atomic group necessary for forming a 5-, 6- or 9-membered heterocyclic ring.

2. The heat-developable photographic element as claimed in claim 1, wherein the base precursor is selected from the group consisting of guanidine trichloroacetate, methylguanidine trichloroacetate, potassium trichloroacetate, guanidine phenylsulfonylacetate, guanidine p-methanesulfonylphenylsulfonylacetate, potassium phenylpropiolate, cesium phenylpropiolate, guanidine phenylpropiolate, guanidine p-chlorophenylpropiolate, guanidine 2,4-dichlorophenylpropiolate, diguanidine p-phenylene-bis-propiolate, tetramethylammonium phenylsulfonylacetate, and tetramethylammonium phenylpropiolate.

3. The heat-developable photographic element as claimed in claim 1, wherein the heterocyclic ring formed by Y contains at least two nitrogen atoms, at least one nitrogen atom and one oxygen atom, or at least one nitrogen atom and one sulfur atom, and said heterocyclic ring is a single ring or is condensed with a benzene nucleus or a naphthalene nucleus.

4. The heat-developable photographic element as claimed in claim 1, wherein the base precursor is present in an amount of 50 wt % or less based on the total weight of the coated layer, and said photographic reagent is present in an amount of 50 wt % or less based on the total weight of the coated layer.

5. The heat-developable photographic element as claimed in claim 1, wherein the base precursor and said photographic reagent are contained in said light-sensitive layer.

6. The heat-developable photographic element as claimed in claim 1, wherein the mordant is a polymeric mordant selected from the group consisting of a polymer comprising a vinyl monomer unit having a tert-amino group, a polymer comprising a vinyl monomer unit having a quaternary imidazolium salt, a polymer comprising a vinyl monomer unit having a quaternary ammonium salt, and a polymer comprising a monomer unit containing a nitrogen-containing heterocyclic portion.

7. The heat-developable photographic element as claimed in claim 1, wherein the dye fixing layer is provided on a second support.

8. The heat-developable photographic element as claimed in claim 1, wherein the dye providing substance is compound having the capability to release or diffuse a diffusible dye in an imagewise pattern represented by formula (II):

$$(\text{Dye-X}_0)_{n_0}\text{Y}_0 \qquad \text{(II)}$$

wherein Dye is a dye or dye precursor group, $X_0$ is a chemical bonding or connecting group, $Y_0$ is a group which produces a difference in diffusibility between the compound of the general formula: $(\text{Dye-X}_0)_{n_0}\text{Y}_0$ in a positive or negative relation to a light-sensitive silver salt having an imagewise latent image, or which releases Dye and produces a difference in diffusibility between the released Dye and $(\text{Dye-X}_0)_{n_0}\text{Y}_0$, and $n_0$ is 1 or 2, provided that when $n_0$ is 2, the two Dye-$X_0$ groups may be the same or different.

9. A method for forming a dye image on a dye fixing element, the dye image of a mobile dye being formed by heating a heat-developable photographic element having at least a light-sensitive silver halide, a binder, and a dye providing substance releasing the mobile dye on heat-development, simultaneously or after imagewise exposure being transferred to the dye fixing element containing a mordant, comprising a photographic reagent capable of releasing a compound represented by formula (I) with the aid of at least one of a base precursor and a base in the heat-developable photographic element or the dye fixing element:

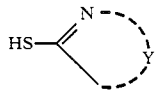

(I)

wherein Y is an atomic group necessary for forming a 5-, 6- or 9- membered heterocyclic ring.

* * * * *